US007171448B1

(12) United States Patent
Danielsen et al.

(10) Patent No.: US 7,171,448 B1
(45) Date of Patent: *Jan. 30, 2007

(54) CONDUCTING ACTIVITIES IN A COLLABORATIVE WORK TOOL ARCHITECTURE

(75) Inventors: Bjorn I. Danielsen, Oslo (NO); Petter Merok, Oslo (NO); Pal K. Fevang, Kokkedal (DK)

(73) Assignee: Accenture ANS, Lysaker (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,037

(22) Filed: Apr. 17, 2000

(51) Int. Cl.
*G06F 15/16* (2006.01)
*G06F 3/00* (2006.01)
(52) U.S. Cl. .................. 709/205; 715/751; 715/963
(58) Field of Classification Search ........ 709/203–207, 709/223, 219; 345/751, 733, 759, 758, 753, 345/731; 705/9, 12; 707/10, 6, 3, 5, 7; 715/751, 715/753, 963
See application file for complete search history.

(56) References Cited

U.S. PATENT DOCUMENTS

| | | | | |
|---|---|---|---|---|
| 5,781,731 | A * | 7/1998 | Koreeda et al. ............ 709/204 |
| 5,874,953 | A * | 2/1999 | Webster et al. ............. 345/733 |
| 5,877,759 | A * | 3/1999 | Bauer ........................ 719/317 |
| 5,902,352 | A * | 5/1999 | Chou et al. ................. 718/102 |
| 5,907,324 | A * | 5/1999 | Larson et al. .............. 715/753 |
| 5,930,471 | A * | 7/1999 | Milewski et al. ........... 709/204 |
| 5,995,951 | A * | 11/1999 | Ferguson ..................... 706/10 |
| 5,999,208 | A * | 12/1999 | McNerney et al. ...... 348/14.08 |
| 6,016,478 | A * | 1/2000 | Zhang et al. .................. 705/9 |
| 6,018,716 | A * | 1/2000 | Denardo et al. ............... 705/7 |
| 6,047,288 | A * | 4/2000 | Kurosawa et al. ............ 707/9 |
| 6,119,147 | A * | 9/2000 | Toomey et al. ............. 709/204 |
| 6,182,273 | B1 * | 1/2001 | Tarumi ...................... 717/101 |
| 6,192,394 | B1 * | 2/2001 | Gutfreund et al. .......... 709/204 |
| 6,192,395 | B1 * | 2/2001 | Lerner et al. ............... 709/204 |
| 6,212,548 | B1 * | 4/2001 | DeSimone et al. ......... 709/204 |
| 6,240,374 | B1 | 5/2001 | Cramer et al. |
| 6,343,313 | B1 * | 1/2002 | Salesky et al. ............. 709/204 |
| 6,346,952 | B1 * | 2/2002 | Shtivelman ................. 345/758 |

(Continued)

FOREIGN PATENT DOCUMENTS

DE          19844362 A1     3/2000

OTHER PUBLICATIONS

Dos Santos et al., "SACE-CSCW: A Synchronous Asynchronous Common Environment for Computer Supported Cooperative Work to Aid Concurrent Engineering Processes", IEEE 1997.*

(Continued)

*Primary Examiner*—William C. Vaughn, Jr.
*Assistant Examiner*—Yemane M. Gerezgiher
(74) *Attorney, Agent, or Firm*—Oppenheimer Wolff & Donnelly LLP

(57) ABSTRACT

The present disclosure provides for conducting activities between users in a collaborative work tool architecture. A client user interface including at least one activity data field is afforded. Then, a selection of a particular activity data field from a user is received. Additional information on the selected activity field is then presented using the client user interface. The user is then allowed to input meeting data concerning the selected activity data field. The received meeting data is stored on a server via a network. Finally, a plurality of participant users are allowed access to the stored meeting data via the network.

18 Claims, 30 Drawing Sheets

U.S. PATENT DOCUMENTS

| | | | |
|---|---|---|---|
| 6,363,352 B1* | 3/2002 | Dailey et al. | 705/9 |
| 6,411,965 B2 | 6/2002 | Klug | |
| 6,457,045 B1* | 9/2002 | Hanson et al. | 709/206 |
| 6,507,845 B1* | 1/2003 | Cohen et al. | 707/100 |
| 6,515,681 B1* | 2/2003 | Knight | 345/751 |
| 6,571,234 B1* | 5/2003 | Knight et al. | 707/3 |
| 6,604,141 B1* | 8/2003 | Ventura | 709/227 |
| 6,606,744 B1 | 8/2003 | Mikurak | |
| 6,608,636 B1 | 8/2003 | Roseman | |
| 6,629,129 B1* | 9/2003 | Bookspan et al. | 709/204 |
| 6,636,888 B1* | 10/2003 | Bookspan et al. | 709/203 |
| 6,643,681 B1* | 11/2003 | Saito et al. | 709/202 |
| 6,671,818 B1 | 12/2003 | Mikurak | |
| 2002/0010742 A1* | 1/2002 | Kihara et al. | 709/204 |

OTHER PUBLICATIONS

Cleetus et al., "GDS- A Group Decision System for Teams", IEEE 1996.*

BSCW User Manual, Copyright Jun. 1996.*

"BCSW 3.1 Help", Jul. 20, 1998.*

"Special Edition Using Microsoft Outlook 2000", GordonPadwick with Helen Feddema, Published May 20, 1999.*

*Dayco* Statement Regarding Related Applications.

Robert Kraut et al., Relationships and tasks in scientific research collaborations, 1986, Proceedings of the 1986 ACM Conference and Computer Support cooperative work, pp. 229-245.

Kenneth L. Kraemer et al., Computer-Based System for Cooperative Work and Group Decision Making, 1988, ACM Computing Surveys, vol. 20, pp. 115-146.

* cited by examiner

CONDUCTING ACTIVITIES IN A COLLABORATIVE WORK TOOL ARCHITECTURE

FIELD OF THE INVENTION

The present invention relates to meeting facilitating software and more particularly to electronic, collaborative work tools.

BACKGROUND OF THE INVENTION

It is a problem in the field of scheduling systems to provide a calendar based system which is both simple to use and provides adequate functionality to justify a company or user in investing in and making use of such a system. There are numerous calendar based time planning systems presently available, and many of these are paper based wherein the user is provided with a calendar which is segmented by a particular time period desired by the user. There are daily, weekly, monthly calendar systems and systems which incorporate combinations of these time periods to enable an individual to schedule meetings and to plan out their daily activities. What differentiates the various scheduling systems embodied in these calendars is the additional features provided by the format used to present the calendar information to the individual. These various formats are typically directed to enabling the individual to list important tasks to be accomplished during the noted time period and/or record expenses that are incurred by the individual in the pursuance of their business.

The scheduling systems of the prior art also include software based systems which typically automate the existing well known paper based systems. The software based scheduling systems provide further enhancements in the form of an address book and other such data management capabilities. These enhancements are disjunct in that they do not integrate with the basic functionality provided by the calendar system. Thus, the software based scheduling systems provide little additional functionality above and beyond those provided by the paper based systems and do not in and of themselves represent a breakthrough in the field of scheduling systems.

Numerous devices and methods have been employed by individuals to record a schedule of activities. Most notably, the Daytimer.™. organizer, a notebook calendar based system has been provided to record appointments, activities and the like. Another calendar based system for recording an activity schedule is disclosed in U.S. Pat. No. 5,271,172 by Ureta. Ureta discloses a calendar system having a separate day sheet for each day where each of the day sheets has on one side a grid with numbered rows for recording activities. On the other side of each day sheet in Ureta, is a 24 hour clock surrounded by 48 enclosed spaces disposed at one half hour increments. Ureta discloses that reference numbers corresponding to activities recorded in the numbered rows on the opposite side of the day sheet can be written in each of these enclosed spaces around the 24 hour clock thereby recording a schedule of activities for a given day. A number of such devises are well known in the art. Maintaining reliable personal schedules has long been a concern of people confronted with numerous and varied activities.

Notwithstanding the presence in the prior art of a number of highly effective scheduling systems such as those referred to above there is a need for a simple scheduling device that can be used by people participating in scheduled activities. More particularly, those participating in an organized group activity require a means to network more effectively.

SUMMARY OF THE INVENTION

The present disclosure provides for conducting activities between users in a collaborative work tool architecture. A client user interface including at least one activity data field is afforded. The interface is operably coupled to a collaborative work environment that has collaborative applications integrated with agents at the client, where the agents are intermediaries between the users and the applications. Background data relevant to the activity data field is automatically acquired. The activity data field includes descriptive text and an activity start time. The automatically aquiring background information includes obtaining a descriptive text when the start time is within a predetermined period; parsing and pattern matching the descriptive text to identify searchable components of the descriptive text; querying a plurality of sources across a network to obtain the background information; and storing the background information that is retrieved in response to querying the plurallity of sources. Then, a selection of a particular activity data field from a user is received. Additional information on the selected activity field is then presented using the client user interface. The user is then allowed to input meeting data concerning the selected activity data field. The received meeting data is stored on a server via a network. Finally, a plurality of participant users are allowed access to the stored meeting data via the network.

In one aspect of the present invention, the meeting data may be voting data on a predefined topic. Optionally, the meeting data may be user readable sentences concerning a predefined topic.

In one embodiment of the present invention, the meeting data may be accessed by the participant users asynchronously. In another embodiment, the meeting data may be accessed by the participant users synchronously. Optionally, the collaborative work tool architecture may be distributed.

BRIEF DESCRIPTION OF THE DRAWINGS

The invention will be better understood when consideration is given to the following detailed description thereof. Such description makes reference to the annexed drawings wherein.

DETAILED DESCRIPTION OF THE PREFERRED EMBODIMENTS

Figure 1A:
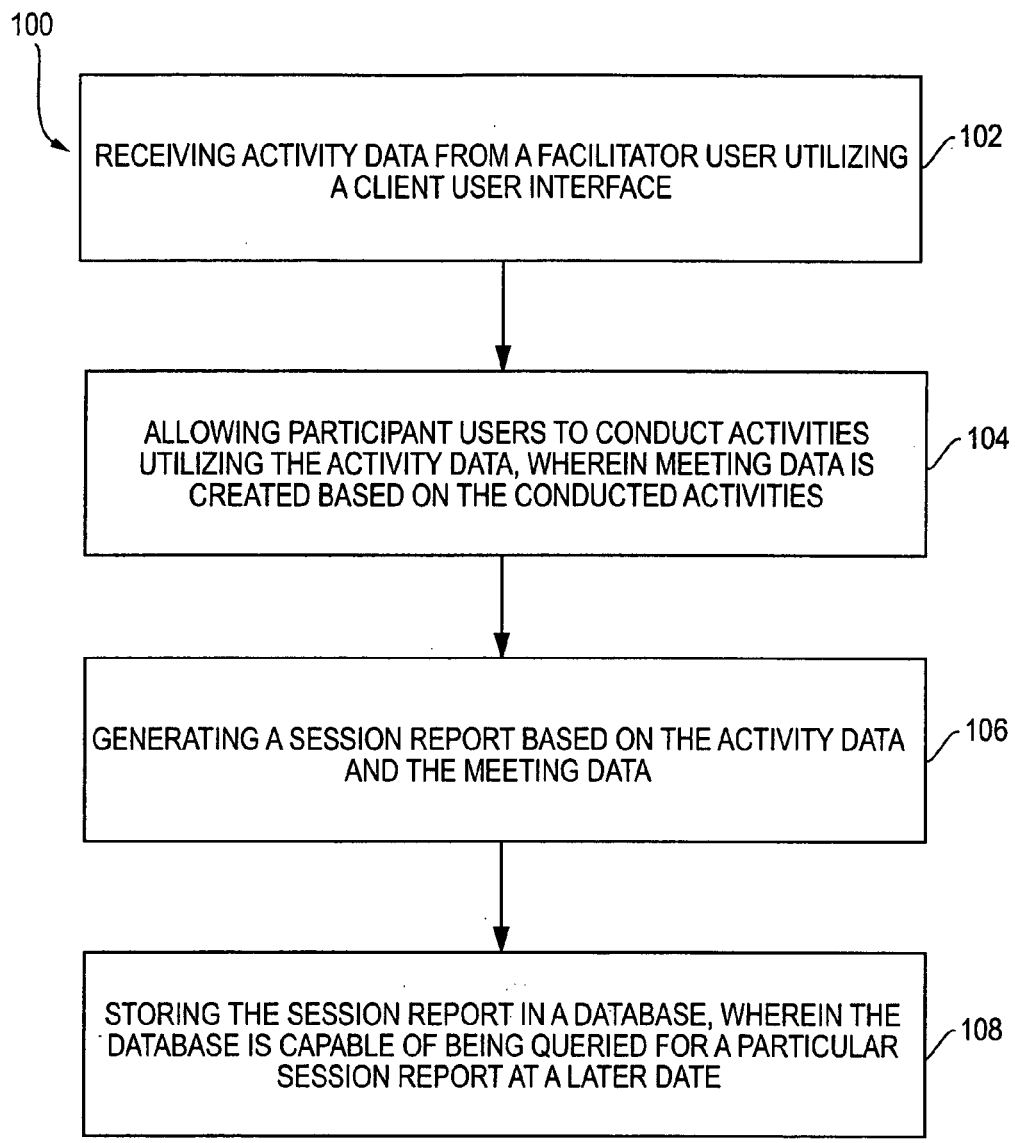
FIG. 1A is a flowchart illustrating a method for affording a collaborative work tool environment, in accordance with an embodiment of the present invention.

FIG. 1A is a flowchart illustrating a method 100 for affording a collaborative work tool environment, in accordance with an embodiment of the present invention. First, in operation 102, activity data is received from a facilitator user utilizing a client user interface. Then, in operation 104, participant users are allowed to conduct activities utilizing the activity data, wherein meeting data is created based on the conducted activities. A session report is then generated based on the activity data and the meeting data, as indicated in operation 106. Finally, in operation 108, the session data is stored in a database, wherein the database is capable of being queried for a particular session at a later date. The present invention is a platform-independent tool that supports both asynchronous and synchronous sessions, independent of the physical whereabouts of the participants. The present invention offers a range of activities,—such as brainstorming and discussion. Advantageously, the present invention provides ease of installation and use, over 300 session participants at a time, high level of security, client-server architecture support, and dial-up capability.

The present invention is an electronic, collaborative work tool that enables efficient and effective collaboration and communication in work sessions between two or more people independent of time and place.

The present invention is further capable of connecting a company's knowledge capital over a network, such as an intranet or the Internet. Further, the present invention provides users with a powerful set of collaborative tools that can help the user achieve their objectives.

Due to its possibilities of both hosting an asynchronous and a distributed meeting, the present invention offers more functionality in its design than a conventional meeting facilitating software. The graphic user interface and the simplicity of use of the present invention are strong points in its advantage. The transparency of the program is a key feature, since the user spends time working on the meeting and the problems therein instead of getting to grips with the program.

To facilitate discussion, important terms related to the present invention will now be defined. The term Groupware refers computer-mediated collaboration that increases the productivity or functionality of person-to-person processes. Groupware services can include the sharing of calendars, collective writing, e-mail handling, shared database access, electronic meetings with each person able to see and display information, and other activities. A taxonomy of collaborative tools will include electronic mail and messaging, group calendaring and scheduling, electronic meeting systems, desktop video and real-time data conferencing (synchronous), non real-time data conferencing (asynchronous), group document handling, workflow and workgroup utilities, development tools groupware frameworks, groupware services, groupware applications and collaborative, internet-based applications and products.

Groupware as a term thus encompasses all tools that allow for distributed collaboration, independent of whether they are synchronous or asynchronous.

The terms asynchronous/synchronous refer to the time-aspect of the meeting hosted on the groupware. With the term asynchronous it is meant that the participants do not have to be attending the session simultaneously. Synchronous tools open up for real-time meetings, i.e. all participants are collaborating at the same time. The present invention is made to facilitate for both kinds of sessions.

Distributed/undistributed refer to the physical placements of the participants. Distributed tools open up for participants that are connected to the tool from remote locations, whilst undistributed groupware demands that the participants are close to each other. The present invention allows for both distributed and undistributed forms of meetings.

Group functionality allows for a structured organization of users. It also increases security by restricting access between the client users of the present invention. Users will not be able to see users from other companies.

In addition the group functionality eases customer support, since the firm administrator will be the first-line responsible support. The firm administrator may then contact central support if the need arises.

The voting activity consists of three different voting "schemes": Yes/No, Scale of Agreement and Scale of Numbers. The Scale of Numbers voting scheme ("scale") is now reprogrammed to allow for the facilitator to specify the range of the scale used in a voting activity. Thus the facilitator may find it useful to have a "1 to 3"-range, or a 2–7 or anything between 1 and 10 (inclusive).

Additionally the facilitator may choose not to participate in the voting, which thus enables groups where the facilitator should observe a discrete and neutral role. The facilitator may skip the voting altogether, and see the results as the participants vote. The facilitator (and participants after they have voted) will also be able to see the spread of the scale voting.

Present invention offers three methods of contributing text to a session:

Brainstorming, Discussion, Categorization. Brainstorming does not allow for replies (ref. normal brainstorming). Discussion allows for replies, whilst Categorization allows the facilitator (only) to structure the contributions by specifying categories where the participants may put their contributions. If the participants do not put their contributions in the correct category (or even the right activity)—the facilitator may move these to the appropriate category.

The facilitator is responsible for planning, conducting and following up the session (meeting). In that regard he must invite people to a session (and create user IDs for the ones that do not have access to the electronic collaborative work environment) and check to see that everything is clear. During the session, the facilitator conducts the session (moves through the agenda), and helps with questions. After the session, the facilitator has a responsibility of following up the session with regard to tasks and participants' wishes. Amongst these responsibilities is distributing the report, although everyone participating may create one at any time. Present invention supports these processes.

Inviting people: present invention has its own user database which contains information about the user, this includes:

Name (first and last)

License holder (who is paying for the use of the system)—which will be tied up to a pricing and billing system.

Department, Location, Phone numbers

Email-address (which also enables users to use the system as a stand-alone mail-program).

The facilitator may only invite people who does not have access to the system through the invitation system. If he needs to invite people who do not yet have access to the program, then he must contact the system administrator who is able to create a user profile for the ones the facilitator needs to be invited. This process is very quick, and includes sending out a mail with user ID and password (and installation files).

The facilitator conducts the session by starting and stopping activities (participants may not contribute to an activity that is not active). In addition the participant may send pop-up chat messages to get everyone's attention whilst using present invention. The participants generally click on an "OK"-button for the message-box to disappear.

There are two types of system administrators: client company administrator (CCA) and super-administrator (SA). The client company administrator is responsible for the use of the present invention within the client organization. Thus client employees who need access to the system contact the CCA to get the installation file and basic support. In addition, the CCA will be responsible to update and maintain the current user list from that specific client company. The CCA is also able to create company groups. He is not able to view or edit other companies' users. The CCA is able to designate roles.

The SA is able to create client company administrators and designate roles (administrator, normal user or guest user) for any company. He does not have access to specific sessions (due to security issues). The SA is able to support the CCA with more advanced support questions.

These roles are supported by present invention. By screening the information sent out to the CCA, present invention enables a secure environment for several companies to work on the same server. In addition, the SA has privileges which enable him to support the various processes.

Figure 1B:
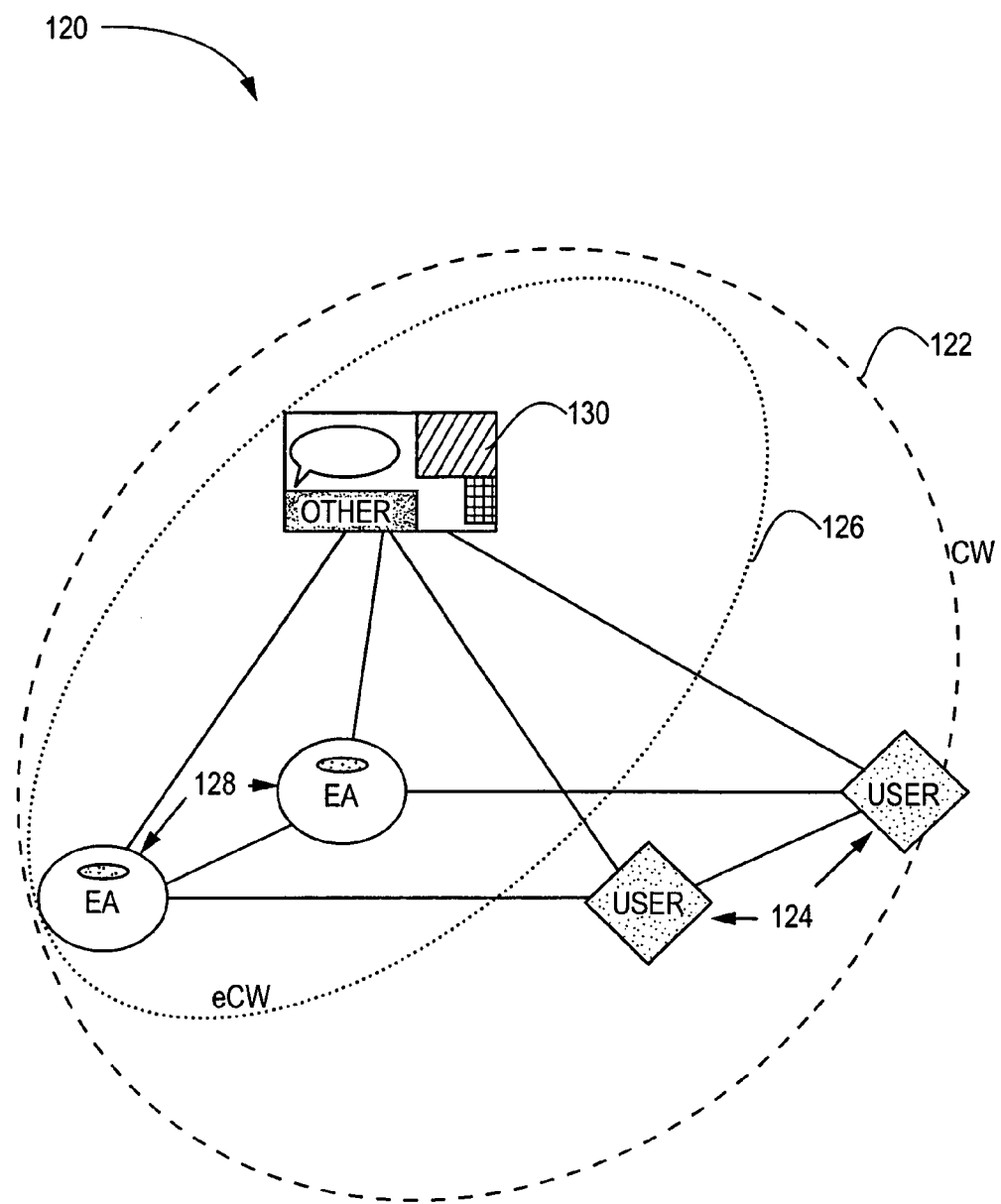
FIG. 1B is an illustration showing a ubiquitous collaborative work environment in accordance with an embodiment of the present invention.

In one embodiment, the present invention provides collaborative service over the Internet, to make a ubiquitous collaborative work environment. FIG. 1B is an illustration showing a ubiquitous collaborative work environment 120 in accordance with an embodiment of the present invention. The ubiquitous collaborative work environment 120 includes a physical collaborative work environment 122 having users 124, and an electronic collaborative work environment 126 having electronic agents 128 and collaborative software 130.

The electronic collaborative work environment utilizes the key elements of people, knowledge, services and supporting software. The ability to instantly share knowledge, search for information and work together will allow members of the collaborative work environment to co-operate on a new level. The collaborative work environment can be split into a physical component (people, knowledge services)—CWE and an electronic component (supporting software).

Figure 1C:
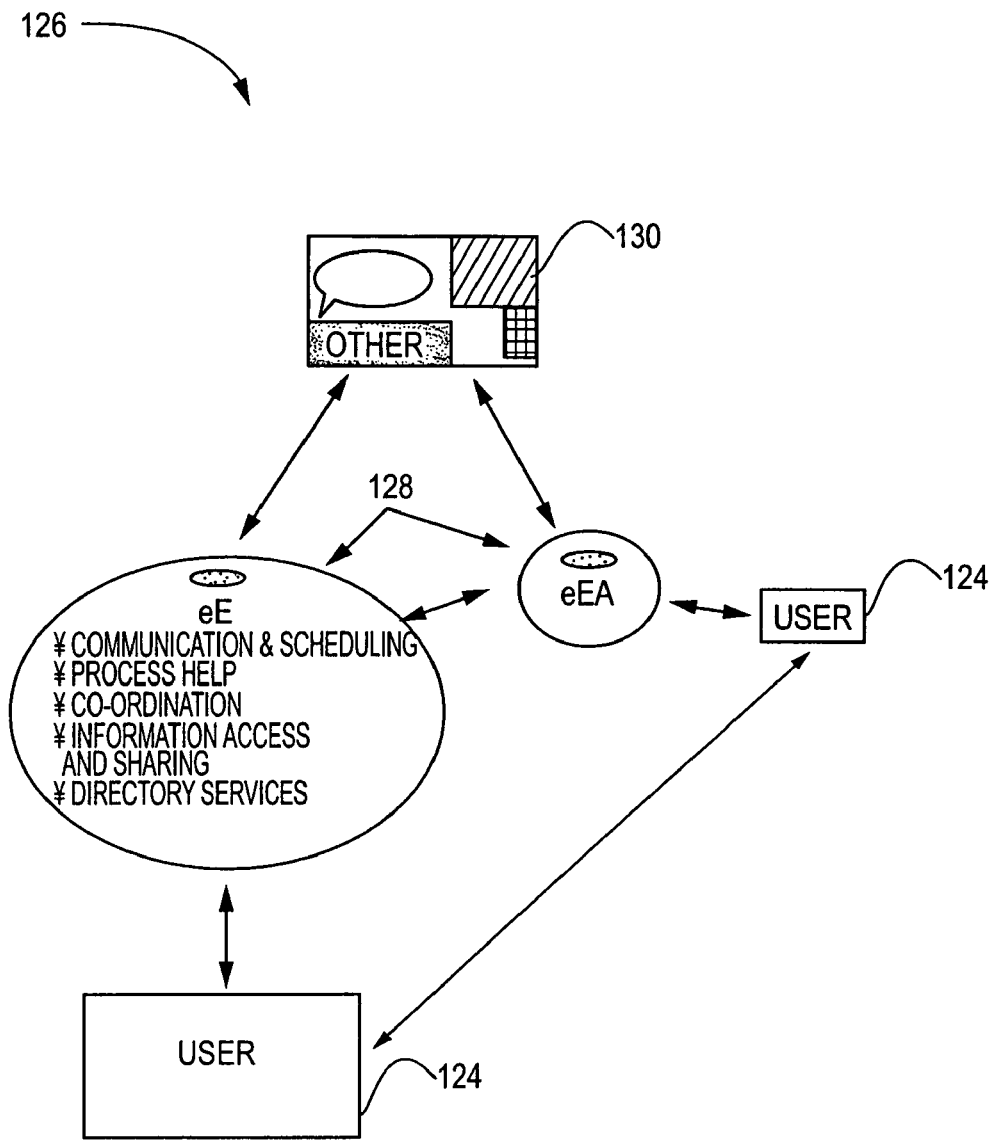
FIG. 1C is an illustration showing an electronic collaborative work environment in accordance with an embodiment of the present invention.

FIG. 1C is an illustration showing an electronic collaborative work environment 126, in accordance with an embodiment of the present invention. The electronic collaborative work environment 126 includes electronic agents 128 and collaborative software 130.

The electronic agents 128 act as intermediaries between the collaborative software 130 and the users 124. In addition each electronic agent serves as an intermediary between the user 124 and the electronic agent 128 of other users 124. electronic agents 128 aid users 124 in the search for others users 124 with the same interests and competencies. As such they are a part of the foundation to create virtual communities, and assist the user 124 in tasks. To illustrate with an example: The electronic agents 128 are able to search out users 124 with wanted competencies and other attributes and allow a user 124 through a directory service to pick the users 124 that comply with their requirements. These can then be invited to the user's personalised electronic collaborative work environment 126.

The electronic agent 128 also enables information gathering both within and outside the collaborative environment, by searching for information/persons that might be of interest to the owner of the electronic agent. As such, extensive profiles may be utilised, to create a more proficient electronic agent. The more information the user enters about himself, the better equipped will the electronic agent 128 be to search and communicate with other agents—and thus provide for a dynamic and vibrant community of users. The electronic agents aid the users to meet the right people at the right time.

Conventional meeting facilitating software ranges across a wide field of asynchronous, synchronous, distributed and undistributed forms of virtual collaboration. The problem with conventional meeting facilitating software is that they are not made for supporting the meeting process.

Figure 2:
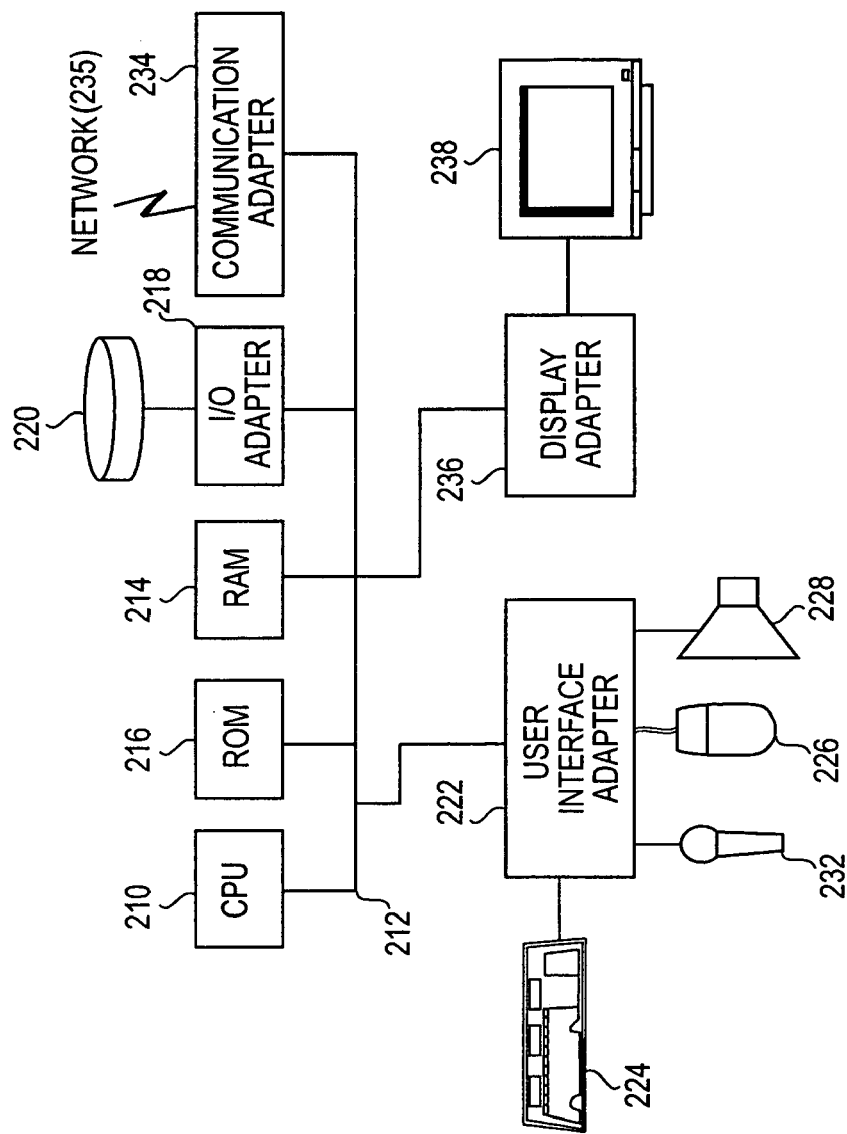
FIG. 2 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 2, which illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out.

These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and ?. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 3:
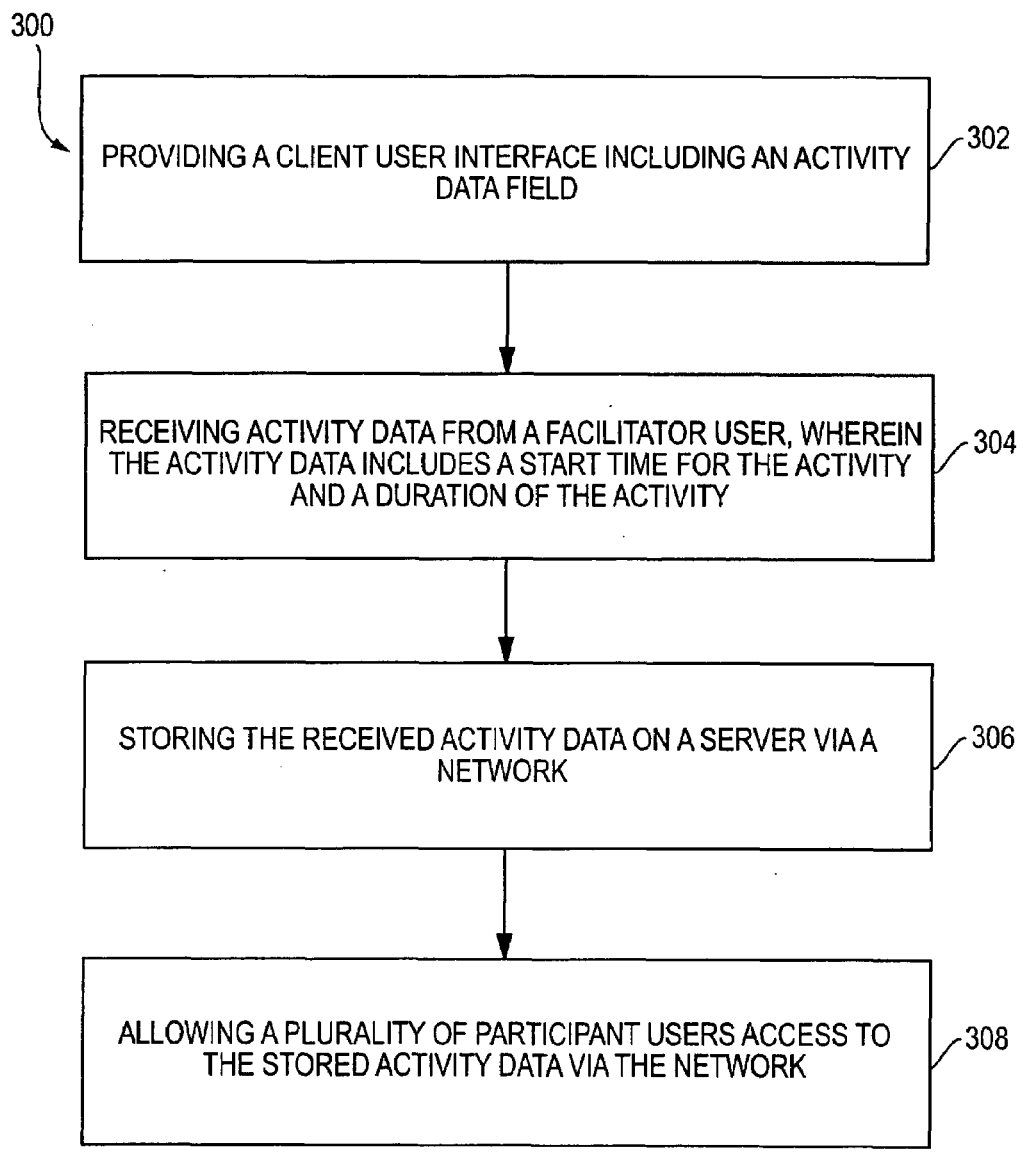
FIG. 3 is a flowchart illustrating a method for affording collaboration planning in a collaborative work tool architecture, in accordance with an embodiment of the present invention.

FIG. 3 is a flowchart illustrating a method 300 for affording collaboration planning in a collaborative work tool architecture, in accordance with an embodiment of the present invention. First, in operation 302, a client user interface including an activity data field is provided. Then, in operation 304, activity data is received from a facilitator user, wherein the activity data includes a start time for the activity and a duration of the activity. The received activity data is then stored on a server via a network, as indicated in operation 306. Finally, a plurality of participant users are allowed access to the stored activity data via the network. See operation 308.

In one aspect of the present invention the participant users asynchronously access the activity data. In another aspect, the participant users synchronously access the activity data.

In one embodiment of the present innovation, the collaborative work tool architecture affords non-distributed work groups. In another embodiment, the collaborative work tool architecture affords distributed work groups.

Additionally, the client user interface may enable real-time user discussion utilizing a chat window.

When planning a meeting utilizing the present invention, a facilitator user is able to invite participant users to a session using the client user interface, discussed in greater detail subsequently. The facilitator user is then able to generate a list of activities, which is similar to an agenda, to occur during the session. The activities can be defined using at least six different activity tools, which are essentially collaboration techniques. These activity tools include, brainstorming tools, discussion tools, categorization tools, voting tools, action list (summary) tools, and external activity (breaks) tools.

Figure 4:
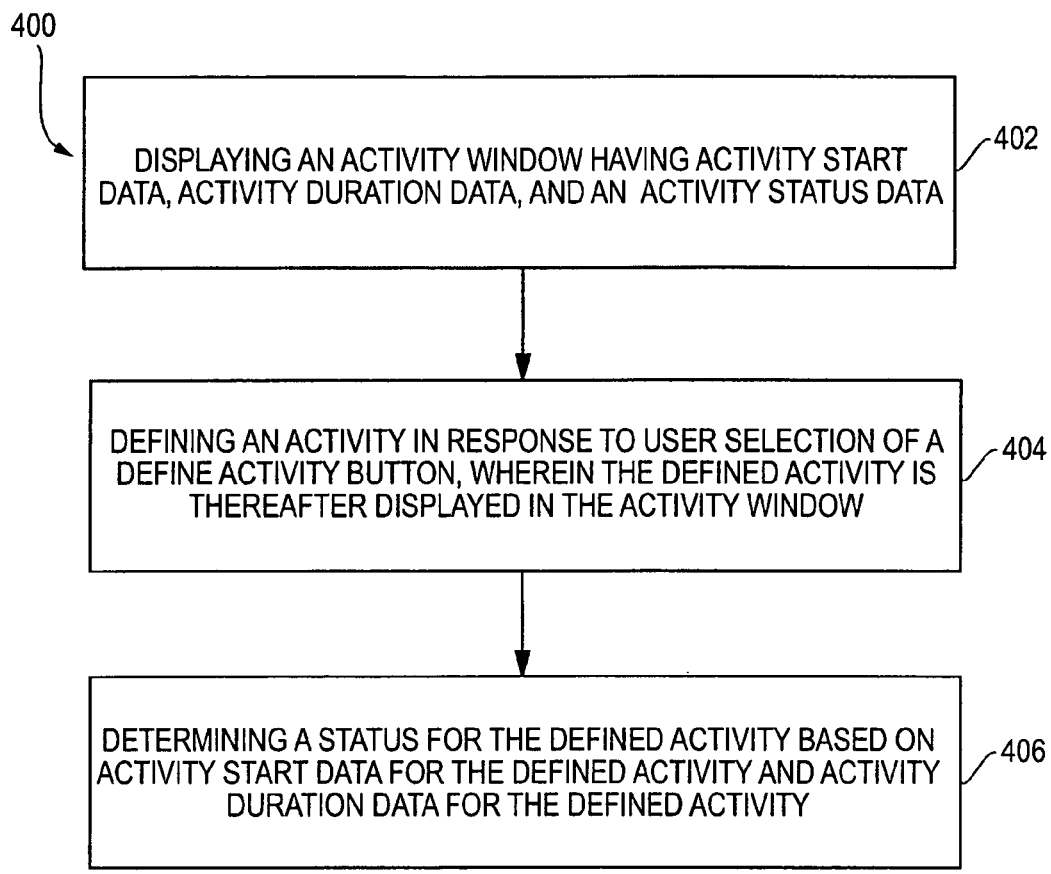
FIG. 4 is a flowchart illustrating a method for listing activities in a graphical user interface in a collaborative work tool framework, in accordance with one embodiment of the present invention.

FIG. 4 is a flowchart illustrating a method 400 for listing activities in a graphical user interface in a collaborative work tool framework, in accordance with one embodiment of the present invention. In an initial operation 402, an activity window having activity start data, activity duration data, and an activity status data is displayed. Then, an activity is defined in response to user selection of a addactivity button, wherein the defined activity is thereafter displayed in the activity window as shown in operation 404. Finally, in operation 406, a status for the defined activity is determined based on activity start data for the defined activity and activity duration data for the defined activity.

In one aspect of the present invention, the activity may be defined as a brainstorming activity. Alternatively, the activity may be defined as a discussion activity. Optionally, the activity may be defined as a categorization activity. Also optionally, the activity may be defined as a voting activity. In addition, the activity may be defined as a summary activity.

In one embodiment of the present invention, a message window capable of displaying user messages in real-time may be displayed Additionally, the defined data may be sent to a specific participant user in response to user selection of the specific participant user from a participant user menu. In another embodiment, the defined activity may be sent to a database in response to user selection of a submit button.

Figure 5:
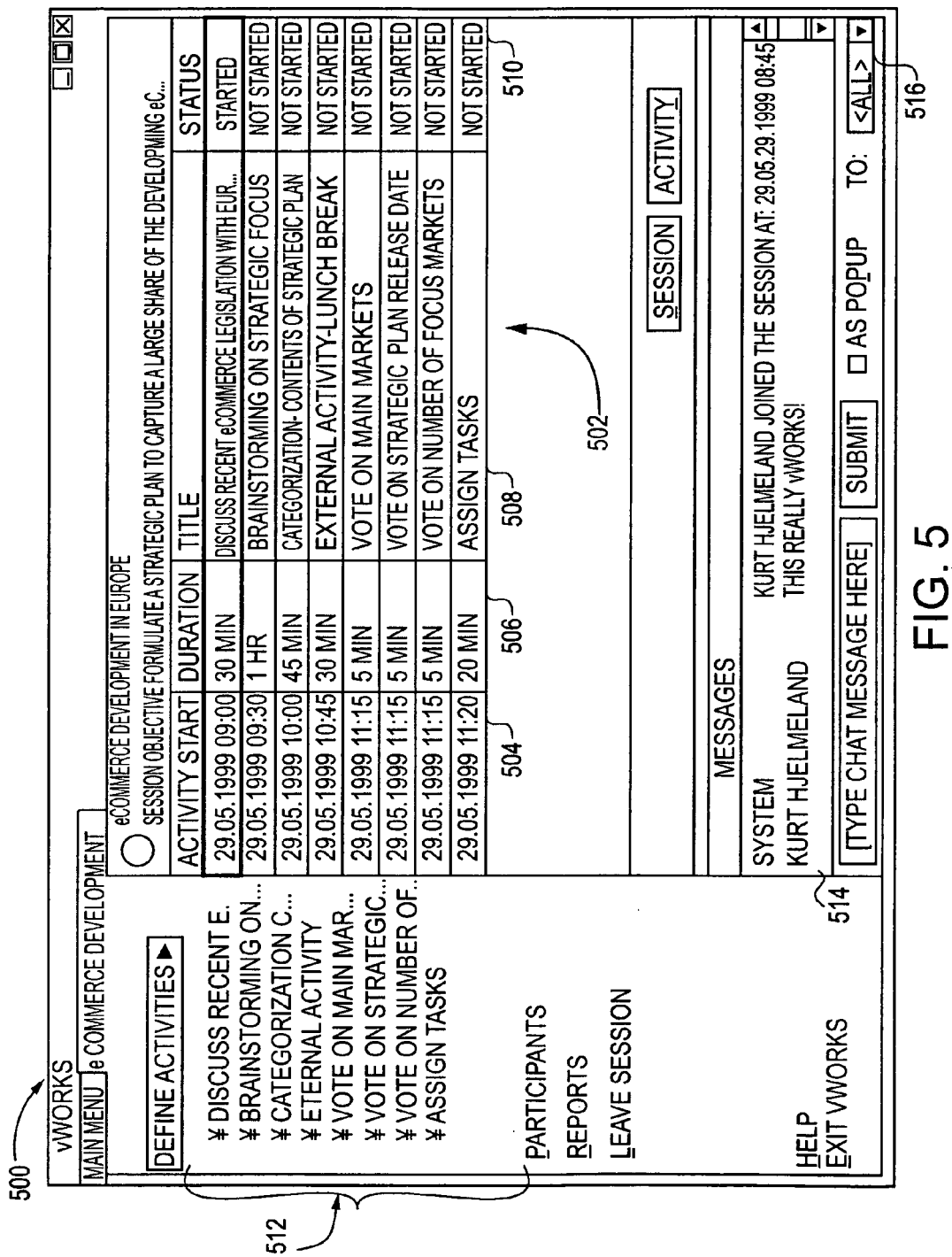
FIG. 5 is an illustration showing a graphical user interface for listing activities in a collaborative work tool framework, in accordance with one embodiment of the present invention.

FIG. 5 is an illustration showing a graphical user interface 500 for listing activities in a collaborative work tool framework, in accordance with one embodiment of the present invention. The graphical user interface 500 includes a list of activities 502, wherein each activity includes an activity start time 504, an activity duration 506, an activity title 508, and an activity status 510.

The graphical user interface 500 further includes a list of predefined activity types 512, a real-time message window 514, and a participant menu 516. The user is further able to define the start time for the activity 504, the duration of the activity 506, and the title of the activity 508 using the list of activities 502 area of the graphical user interface 502.

In this manner, an activity list for a session may be created. Furthermore, other session participants may view the agenda in preparation for the session. Participants may further interact with one another using the real-time message window 514. The participant menu 516 may be selected using a computer pointing device. Once selected, the participant menu preferable displays a list of session participants to which a user may send messages and other information. Thus, using the participant menu 516, a user may direct communications to specific users, or choose to send communications to a group of users. Optionally, the participants users may use the participant menu ("Online Now") 520 to direct communications to specific users. Finally, during the session, the present invention determines a status 510 for each activity in the list of activities 502 utilizing the activity start time 504 and the activity duration 506.

Figure 6:
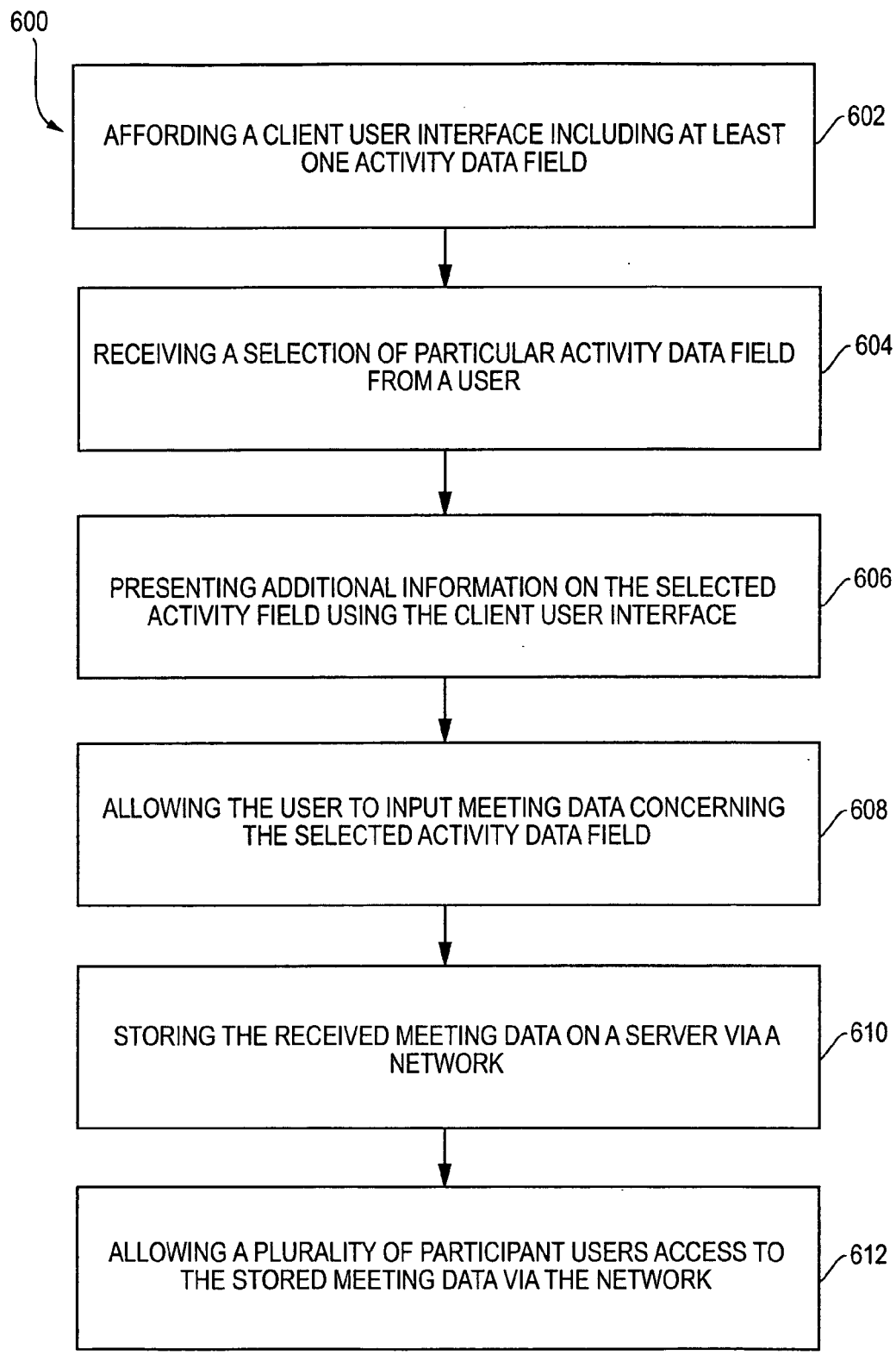
FIG. 6 is a flowchart showing a method for conducting activities in a collaborative work tool architecture, in accordance with an embodiment of the present invention.

FIG. 6 is a flowchart showing a method 600 for conducting activities in a collaborative work tool architecture, in accordance with an embodiment of the present invention. In an initial operation 602, a client user interface including at least one activity data field is afforded. Then, in operation 604, a selection of a particular activity data field from a user is received. Additional information on the selected activity field is then presented using the client user interface. See operation 606. The user is then allowed to input data concerning the selected activity data field as indicated in operation 608. In operation 610, the received data is stored on a server via a network. Finally, in operation 612, a plurality of participant users are allowed access to the stored data via the network.

In one aspect of the present invention, the meeting data may be voting data on a predefined topic. Optionally, the meeting data may be user readable sentences concerning a predefined topic. Alternatively, the data may be user readable assigned tasks as defined by the participant users.

In one embodiment of the present invention, the data may be accessed by the participant users asynchronously. In another embodiment, the data may be accessed by the participant users synchronously. In one embodiment of the present innovation, the collaborative work tool architecture affords non-distributed work groups. In another embodiment, the collaborative work tool architecture affords distributed work groups.

The present invention allows a user to conduct a session having formal collaboration, using the activity tools, and/or informal communication, using the real-time message window. Moreover, the present invention allows the user to conduct multiple activities within a session simultaneously. Additionally, the user may conduct activities anonymously utilizing the present invention.

Figure 7A:
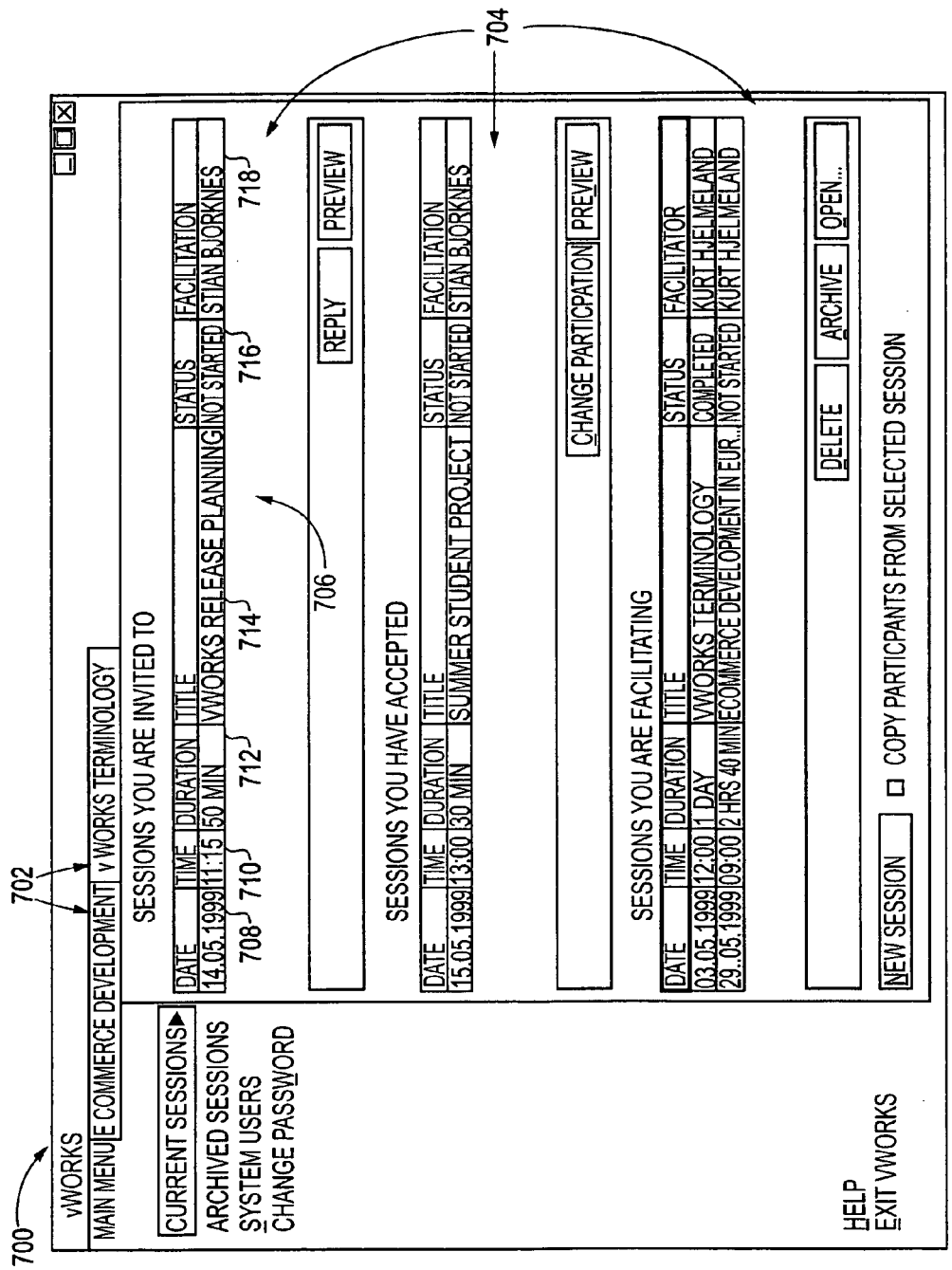
FIG. 7A is an illustration showing a graphical user interface for conducting activities in a collaborative work tool architecture, in accordance with an embodiment of the present invention.

FIG. 7A is an illustration showing a graphical user interface 700 for conducting sessions in a collaborative work tool architecture, in accordance with an embodiment of the present invention. The graphical user interface 700 includes session selection tabs 702, a list of sessions 704, wherein the list of sessions 704 includes sessions 706. As discussed previously, each session 706 includes an activity start date 708, an activity start time 710, a session duration 712, an activity title 714, and an activity status 716. In addition, a facilitator 718 is listed for each activity.

In use, a user may elect to participate in a session 706 by selecting a reply button 720 using a computer selection device, such as a mouse. In this manner, users may participate in multiple sessions simultaneously. Moreover, individual users may selectively indicate which sessions they will participate in and facilitator users may select which users to invite to particular sessions. As discussed in greater detail previously, the present invention determines a status 716 for each activity as the sessions proceed.

Figure 7B:
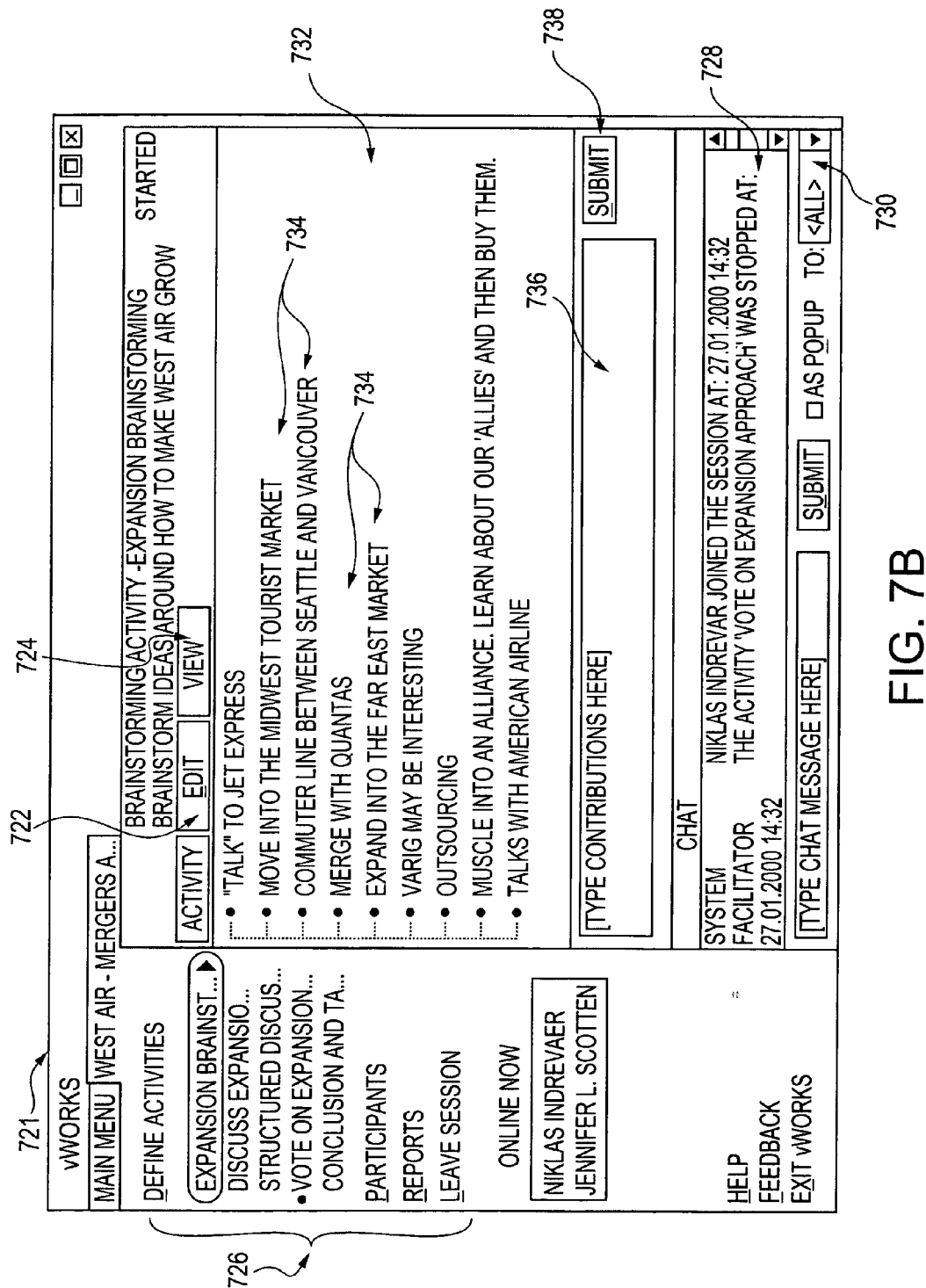
FIG. 7B is a flowchart showing a method for brainstorming in a collaborative work tool architecture, in accordance with an embodiment of the present invention.

FIG. 7B is a flowchart showing a method 1 for brainstorming in a collaborative work tool architecture, in accordance with an embodiment of the present invention. In operation 2, a single-tier discussion tree is displayed in response to selection of a brainstorming button by a facilitator user. Then, tree node text providing tree node definitions is received from the user wherein the user is able to contribute to the single-tier discussion tree, as indicated in operation 4. The tree node definitions are then stored in a database using a network. See operation 6. Finally, in operation 8, access to the tree node definitions is provided to a plurality of participant users, wherein the participant users are able to contribute to the single-tier discussion tree, as discussed in greater detail with reference to FIG. 7C next.

Figure 7C:
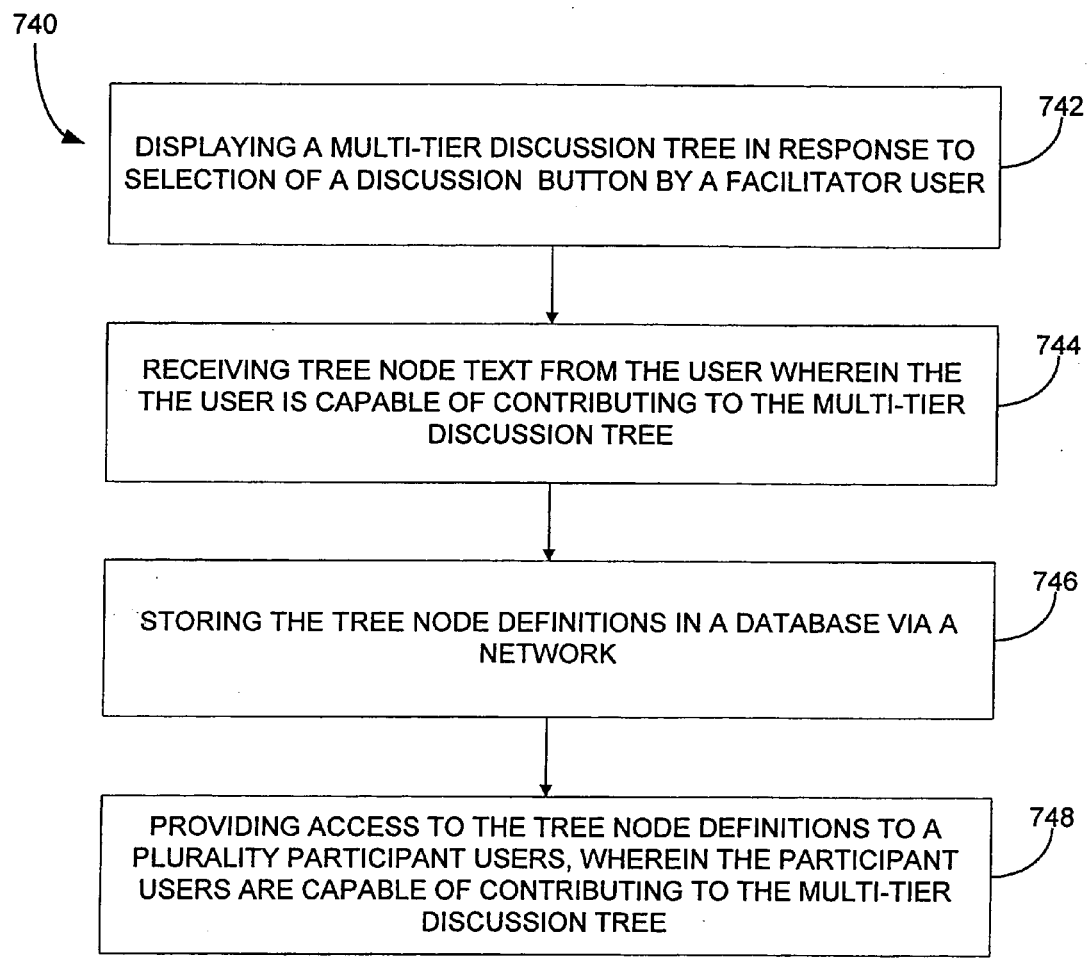
FIG. 7C is an illustration showing a graphical user interface for performing brainstorming activities in a collaborative work tool framework, in accordance with one embodiment of the present invention.

FIG. 7C is an illustration showing a graphical user interface 721 for performing brainstorming activities in a collaborative work tool framework, in accordance with one embodiment of the present invention. The graphical user interface 721 includes an edit button 722, a view button 724, a list of predefined activity types 726, a real-time message window 728, a participant menu 730, a brainstorming contribution window 732 having idea expressions 734, and a contribution input widow 736.

In use, the user is further able to add "brainstorming" ideas to the list of idea expressions 734 utilizing the contribution input window 736. The user enters their contribution into the contribution input window 736 and then submits the entered idea expression utilizing a submit button 738. The entered idea expression is then be listed in the brainstorming contribution window 732. It should be borne in mind that "brainstorming" in the present invention generally allows only posting. This is, generally replies to idea contributions are not allowed in the brainstorming activity. For replies, the discussion activity is utilized, as discussed in greater detail subsequently.

Figure 7D:
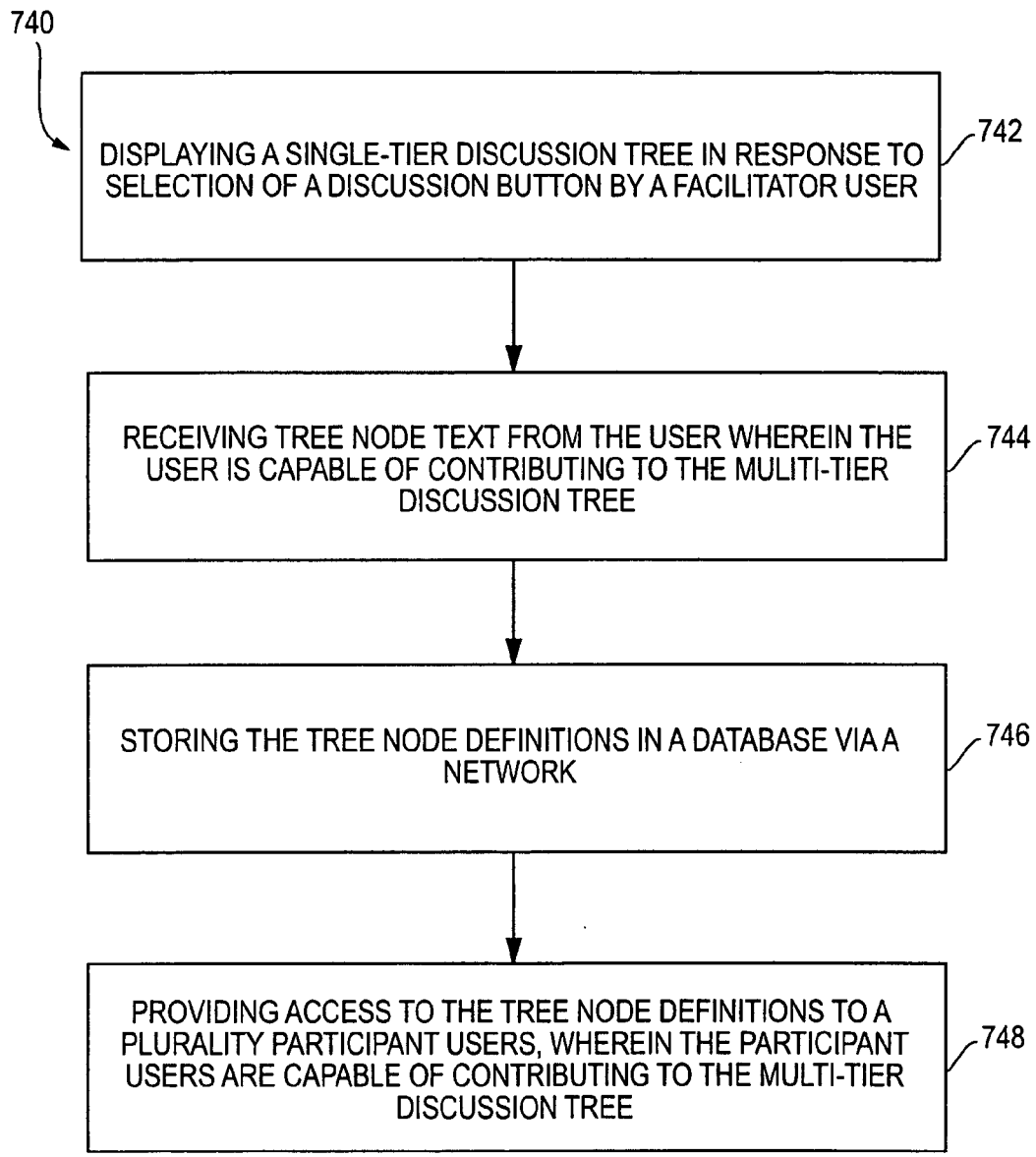
FIG. 7D is a flowchart showing a method for providing discussion in a collaborative work tool architecture, in accordance with an embodiment of the present invention.

FIG. 7D is a flowchart showing a method 740 for providing discussion in a collaborative work tool architecture, in accordance with an embodiment of the present invention. In operation 742, a single-tier discussion tree is displayed in response to selection of a discussion button by a facilitator user. Then, tree node text providing tree node definitions is received from the user wherein the user is able to contribute to the single-tier discussion tree, as indicated in operation 744. The tree node definitions are then stored in a database using a network. See operation 746. Finally, in operation 748, access to the tree node definitions is provided to a plurality of participant users, wherein the participant users are able to contribute to the single-tier discussion tree, as discussed in greater detail subsequently with reference to FIG. 7E.

Figure 7E:
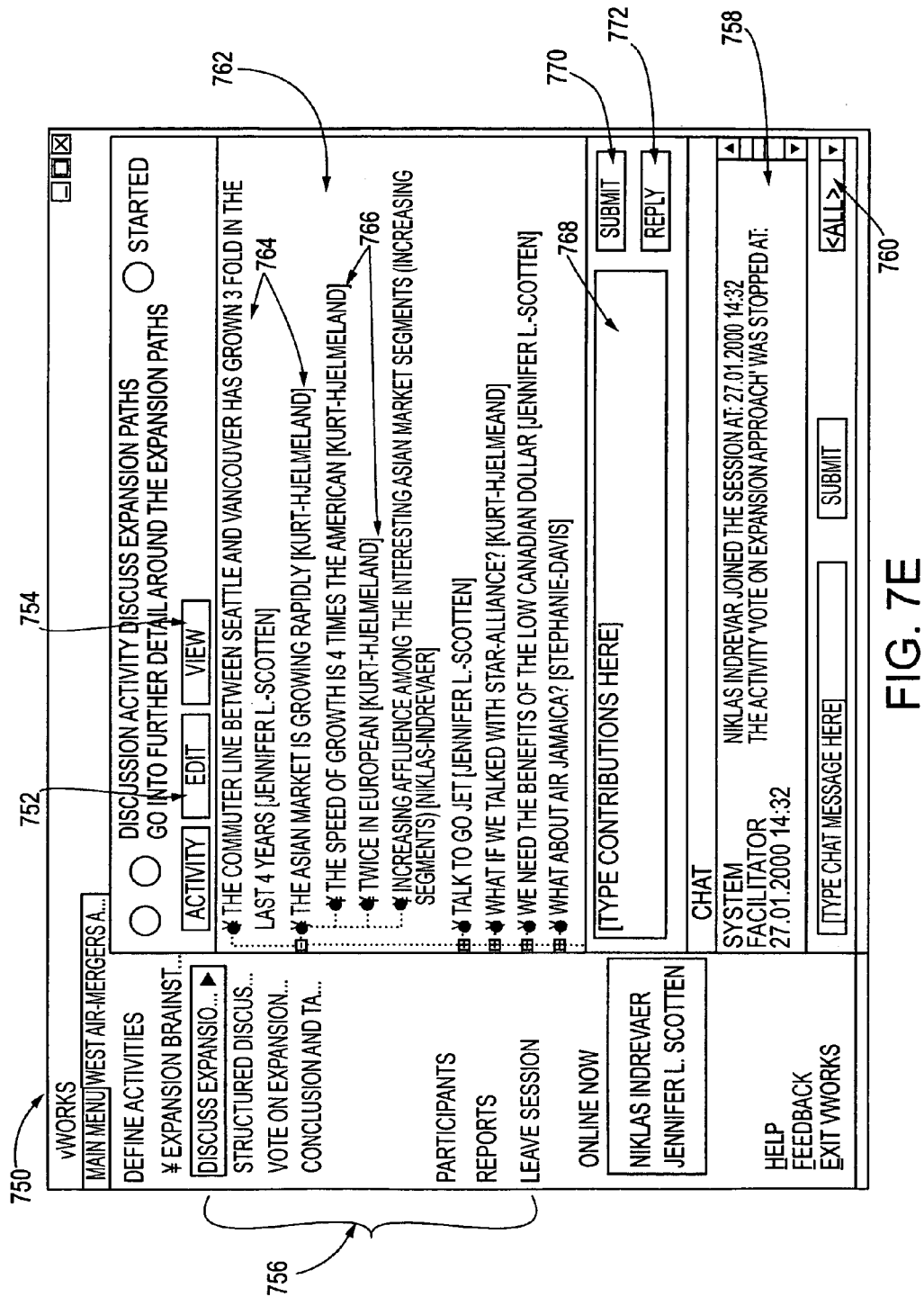
FIG. 7E is an illustration showing a graphical user interface for performing discussion activities in a collaborative work tool framework, in accordance with one embodiment of the present invention.

FIG. 7E is an illustration showing a graphical user interface 750 for performing discussion activities in a collaborative work tool framework, in accordance with one embodiment of the present invention. Similar to the graphical user interface of FIG. 7C, the graphical user interface 750 of FIG. 7C includes an edit button 752, a view button 754, a list of predefined activity types 756, a real-time message window 758, and a participant menu 760. The graphical user interface 750 further includes a discussion contribution window 762 having discussion expressions 764 and replies 766, and a contribution input widow 768.

In operation, the user is further able to add "discussion" ideas to the list of discussion expressions 764 utilizing the contribution input window 768. The user enters their contribution into the contribution input window 768 and then submits the entered discussion expression utilizing a submit button 770. The entered discussion expression is then listed in the discussion contribution window 762.

The user is further able to reply to discussion expressions 764 utilizing the contribution input window 768. The user enters their reply into the contribution input window 768 and then submits the entered reply utilizing a reply button 772. The entered reply 766 is then listed in the discussion contribution window 762 under the corresponding discussion expression 764.

Figure 8:
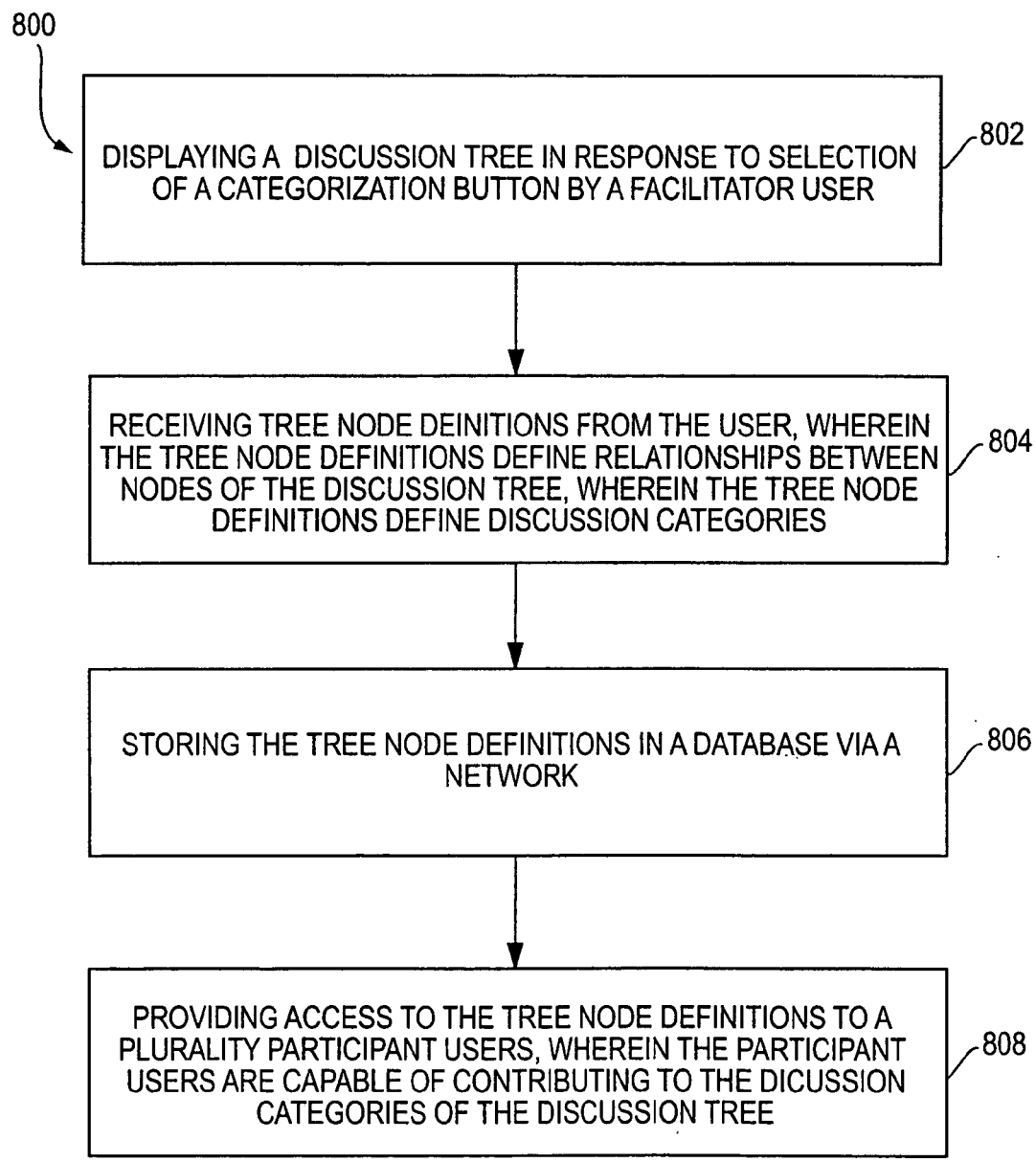
FIG. 8 is flowchart illustrating a method for displaying an optional relational multi-tier tree architecture in a graphical user interface in a collaborative work tool framework, in accordance with an embodiment of the present invention.

FIG. 8 is flowchart illustrating a method 800 for displaying a relational tree architecture in a graphical user interface in a collaborative work tool framework, in accordance with an embodiment of the present invention. First, in response to selection of a categorization button by a facilitator user, a discussion tree is displayed in an initial operation 802. Then, in operation 804, tree node definitions are received from the user, wherein the tree node definitions define relationships between nodes of the discussion tree, and wherein the tree node definitions are defined by discussion categories. In operation 806, the tree node definitions are then stored in a database via a network. Finally, access to the tree node definitions is provided to a plurality participant users, wherein the participant users are capable of contributing to the discussion tree of the discussion categories. See operation 808.

In one aspect of the present invention, the defined relationships between the nodes of the discussion tree are hieratical relationships. Additionally, the tree nodes of the discussion tree may be collapsible.

In one embodiment of the present invention, a message window capable of displaying real-time messages from participant users is displayed. In another embodiment, the real-time messages is sent to a specific participant user in response to selection of the specific participant user from a participant user menu. In yet a further embodiment, participant users may add contributions to the discussion categories by selecting a specific tree node from the discussion tree utilizing computer pointing device.

Figure 9:
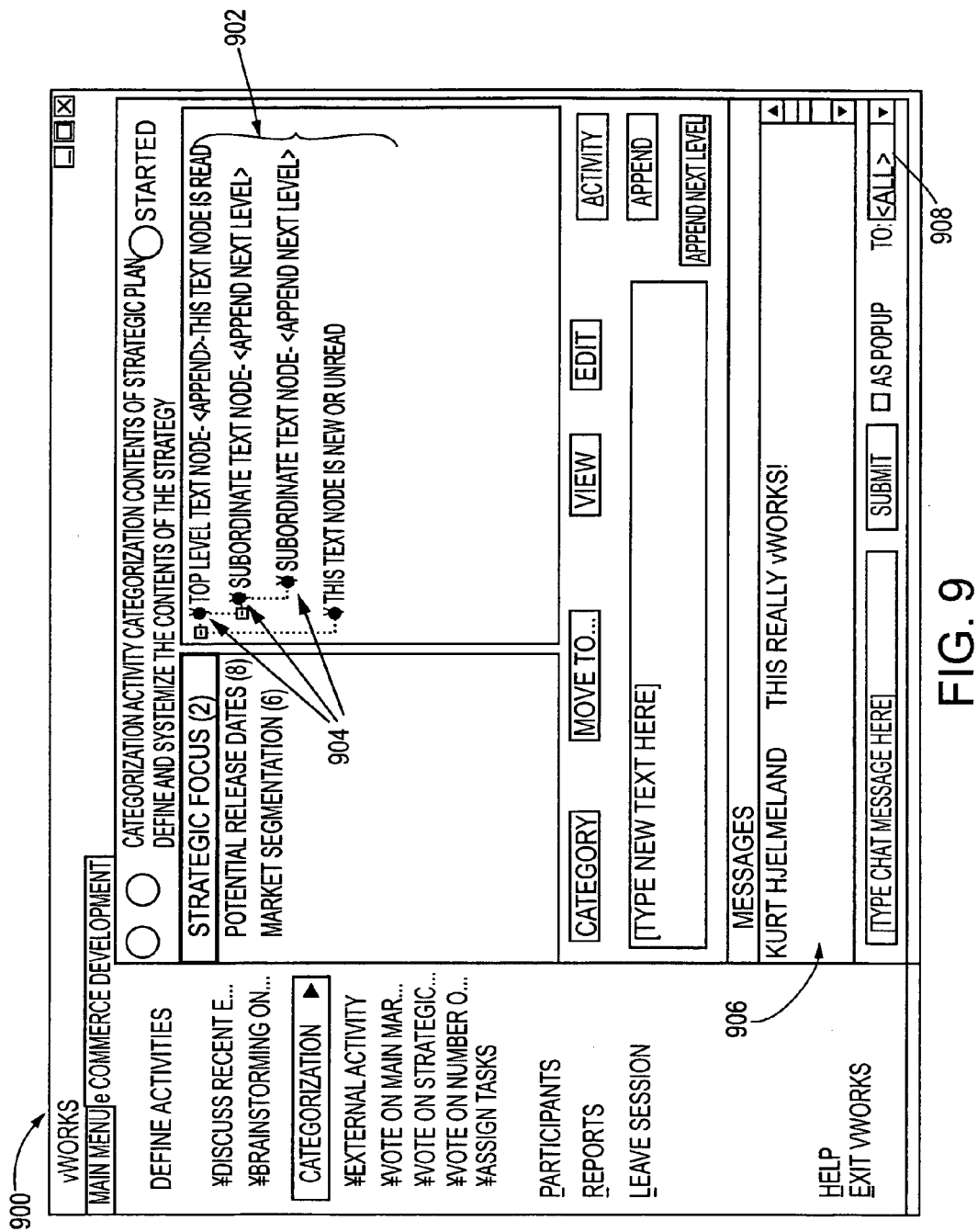
FIG. 9 is an illustration showing a graphical user interface for displaying an optional relational multi-tier tree architecture in a graphical user interface in a collaborative work tool framework, in accordance with an embodiment of the present invention.

FIG. 9 is an illustration showing a graphical user interface 900 for displaying a relational tree architecture in a graphical user interface in a collaborative work tool framework, in accordance with an embodiment of the present invention. The graphical user interface 900 includes a discussion tree 902 having discussion tree nodes 904, a real-time message window 906, and a participant menu 908. The discussion tree 902 provides users with a hierarchal view of the discussion tree nodes 904. In this manner, topics for a session may be organized in an easily definable top down hierarchal tree structure, allowing participants to easily view and participate in the various topics of the session.

In use, participants may select discussion nodes to add their contributions to the various categories. In addition, to the formal collaboration using categorization activities, such as the discussion tree set forth above, informal communication may be accomplished utilizing the real-time message window 906. As described previously, users may communicate in real-time using the real-time message window 906 in conjunction with the participant menu 908. Hence, the present invention supports both formal and informal communication among participants of a session.

Figure 10:
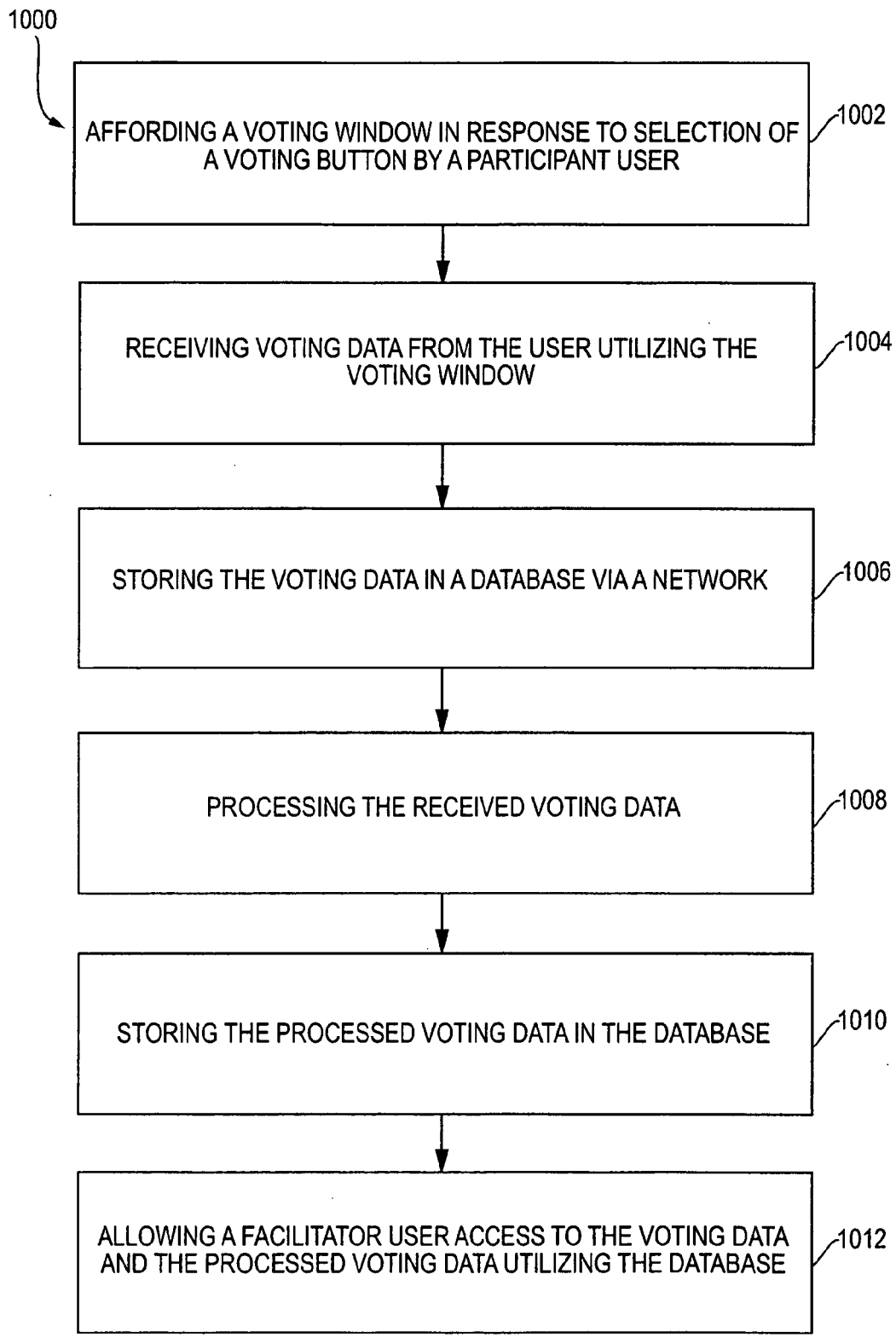
FIG. 10 is a flowchart illustrating a method for affording voting via a graphical user interface in a collaborative work tool framework, in accordance with an embodiment of the present invention.

FIG. 10 is a flowchart illustrating a method 1000 for affording voting via a graphical user interface in a collaborative work tool framework, in accordance with an embodiment of the present invention. First, in operation 1002, in response to selection of a voting button by a participant user, a voting window is provided. Then, in operation 1004, voting data is received from the user utilizing the voting window. The voting data is then stored in a database via a network, as indicated in operation 1006. Next, in operation 1008, the received voting data is processed. The processed voting data is thereafter stored in the database. See operation 1010. Finally, in operation 1012 a user is allowed access to the voting data and the processed voting data utilizing the database.

In one aspect of the present invention, the voting window displays agreement voting information. Optionally, the voting window may display yes/no voting information. Also optionally, the voting window may display customised scale voting information.

In one embodiment of the present invention, the voting window may display voting information on a plurality of issues. In another embodiment, a message window capable of displaying user messages real-time is displayed.

Figure 11:
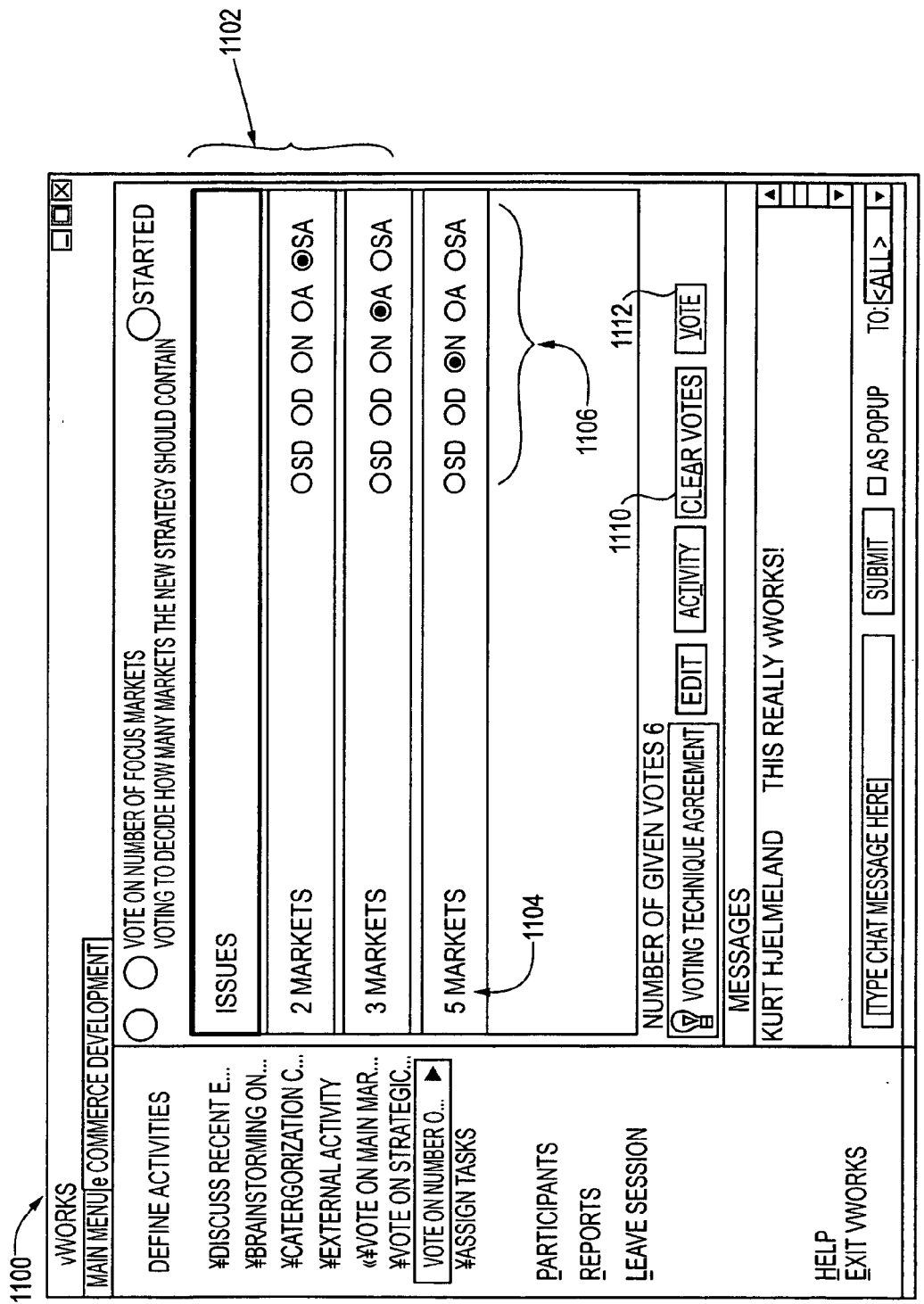
FIG. 11 is an illustration showing a graphical user interface for affording voting via a graphical user interface in a collaborative work tool framework, in accordance with an embodiment of the present invention.

FIG. 11 is an illustration showing a graphical user interface 1100 for affording voting via a graphical user interface in a collaborative work tool framework, in accordance with an embodiment of the present invention. Then graphical user interface 1100 includes a list of voting issues 1102, each having an issue description 1104 and voting options 1106. In addition, the graphical user interface 1100 includes voting type display 1108, a clear votes button 1110, and a send vote button 1112.

In use, a user selects a voting issue 1102 using the issue description 1104. The user then selects their voting preference using the voting options 1106 of the voting issue 1102. FIG. 11 shows an example of agreement voting, however, preferably the present invention may support yes/no voting and customised scale voting. The voting type display 1108 shows the type of voting activity currently in use. At any point in the voting process, the present invention preferably allows the user to clear the voting field of all voting issues by selecting the clear votes button 1110. Once the user is satisfied with their voting selections, the user submits their votes by selecting the final vote button 1112.

Figure 12:
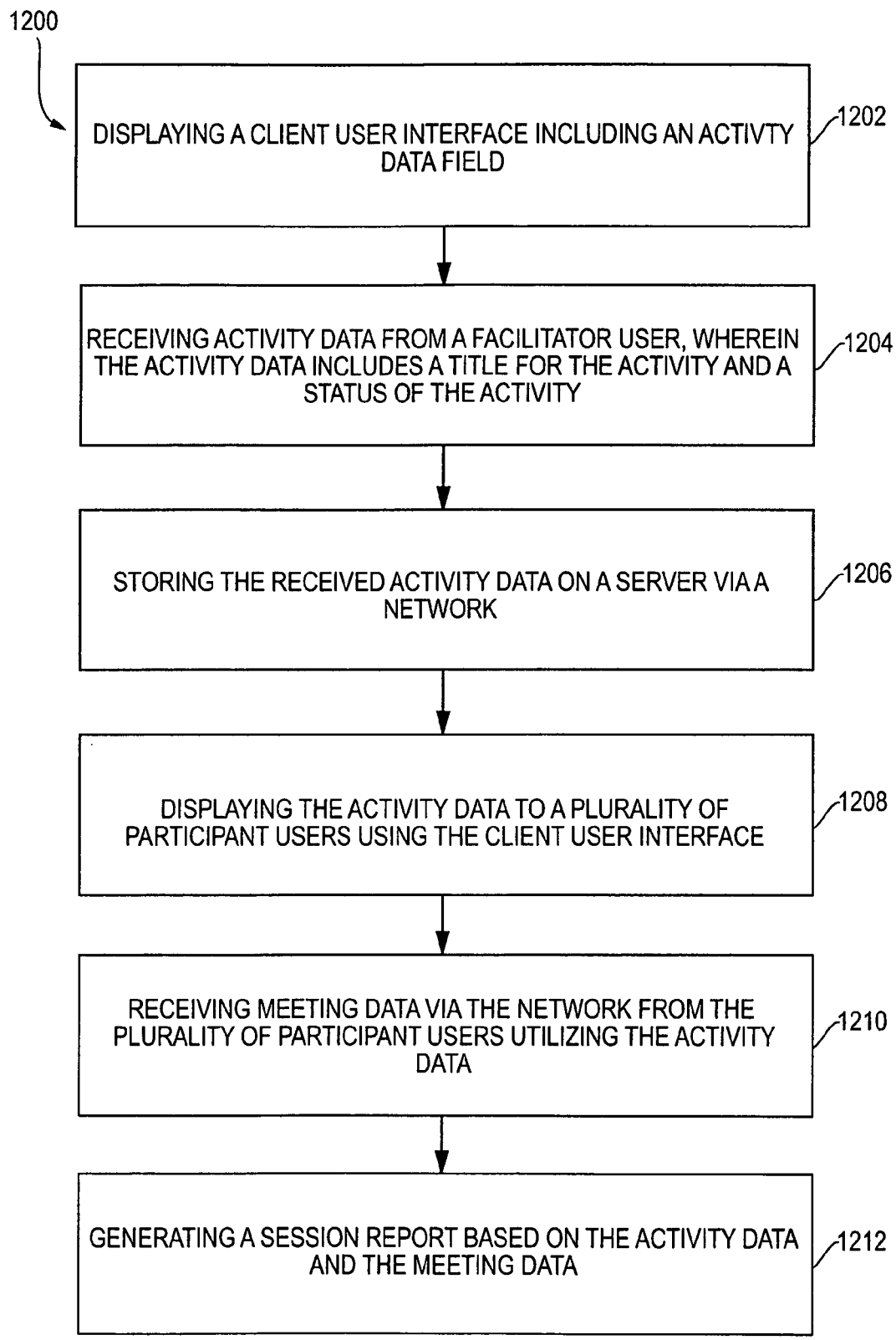
FIG. 12 is a flowchart illustrating a method for reporting in a collaborative work tool architecture, in accordance with an embodiment of the present invention.

FIG. 12 is a flowchart illustrating a method 1200 for reporting in a collaborative work tool architecture, in accordance with an embodiment of the present invention. A client user interface including an activity data field is displayed in an initial operation 1202. Then, in operation 1204, activity data is received from a facilitator user, wherein the activity data includes a title for the activity and a status of the activity. The received activity data is then stored on a server via a network in operation 1206. Next, as shown in operation 1208, the activity data is displayed to a plurality of participant users using the client user interface. Meeting data is then received via the network from the plurality of participant users utilizing the activity data. See operation 1210. Finally, a session report is generated based on the activity data and the meeting data as indicated in operation 1212.

In one aspect of the present invention, the session report is generated as an HTML file. In another aspect, the facilitator user is allowed to edit the session report. In yet a further aspect, the session report is sent to the participant users via the network.

In one embodiment of the present invention, the network is the Internet. Optionally, the network may be an intranet. Additionally, the activity data may include a start time for the activity and a duration of the activity.

The present invention allows a session report to be created at anytime during a session. Moreover, the session report may include a selection or all of the activities listed for the session. Furthermore, the report may be saved as word processing document, such as a Microsoft Word document, and/or an HTML file capable of being further edited in any text editor that supports HTML.

Figure 13:
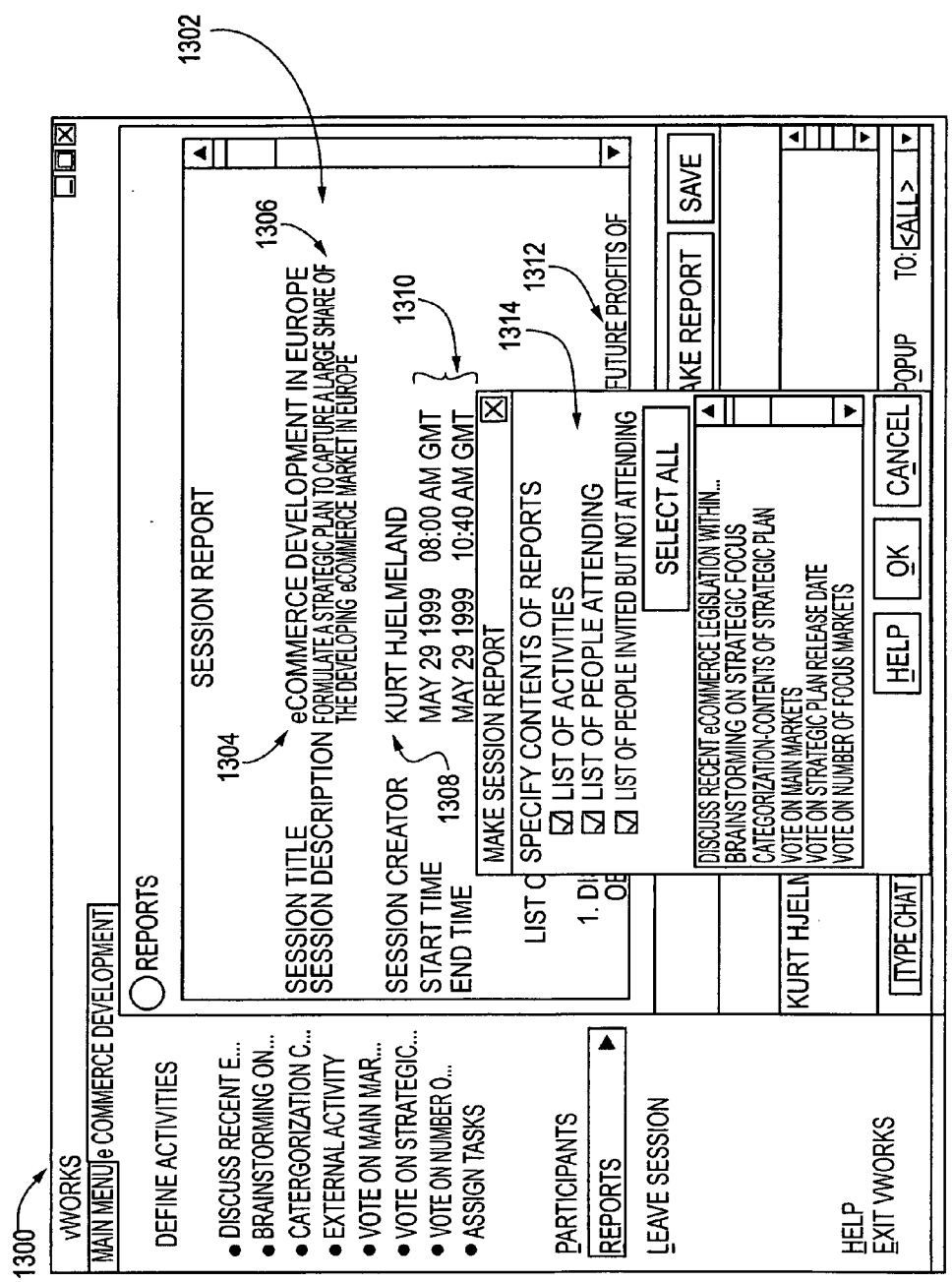
FIG. 13 is an illustration showing a graphical user interface for reporting in a collaborative work tool architecture, in accordance with an embodiment of the present invention.

FIG. 13 is an illustration showing a graphical user interface 1300 for reporting in a collaborative work tool architecture, in accordance with an embodiment of the present invention. The graphical user interface 1300 includes a report window 1302 which displays a session report having a session title 1304, a session description 1306, a session creator 1308, and a session start and end time 1310. In addition, the report window 1302 further includes a list of the activities 1312 that occurred during the session.

To assist in the creation of the session report, the graphical user interface 1300 includes a session creation assistant 1314. The session creation assistant 1314 allows a user to select what will be included in the session report, such as a list of the session activities, a list of the session participants, and a list of the people invited but not participating in the session. Using the session creation assistant 1314, a user may easily create session reports and distribute the reports to desired individuals.

Figure 14A:
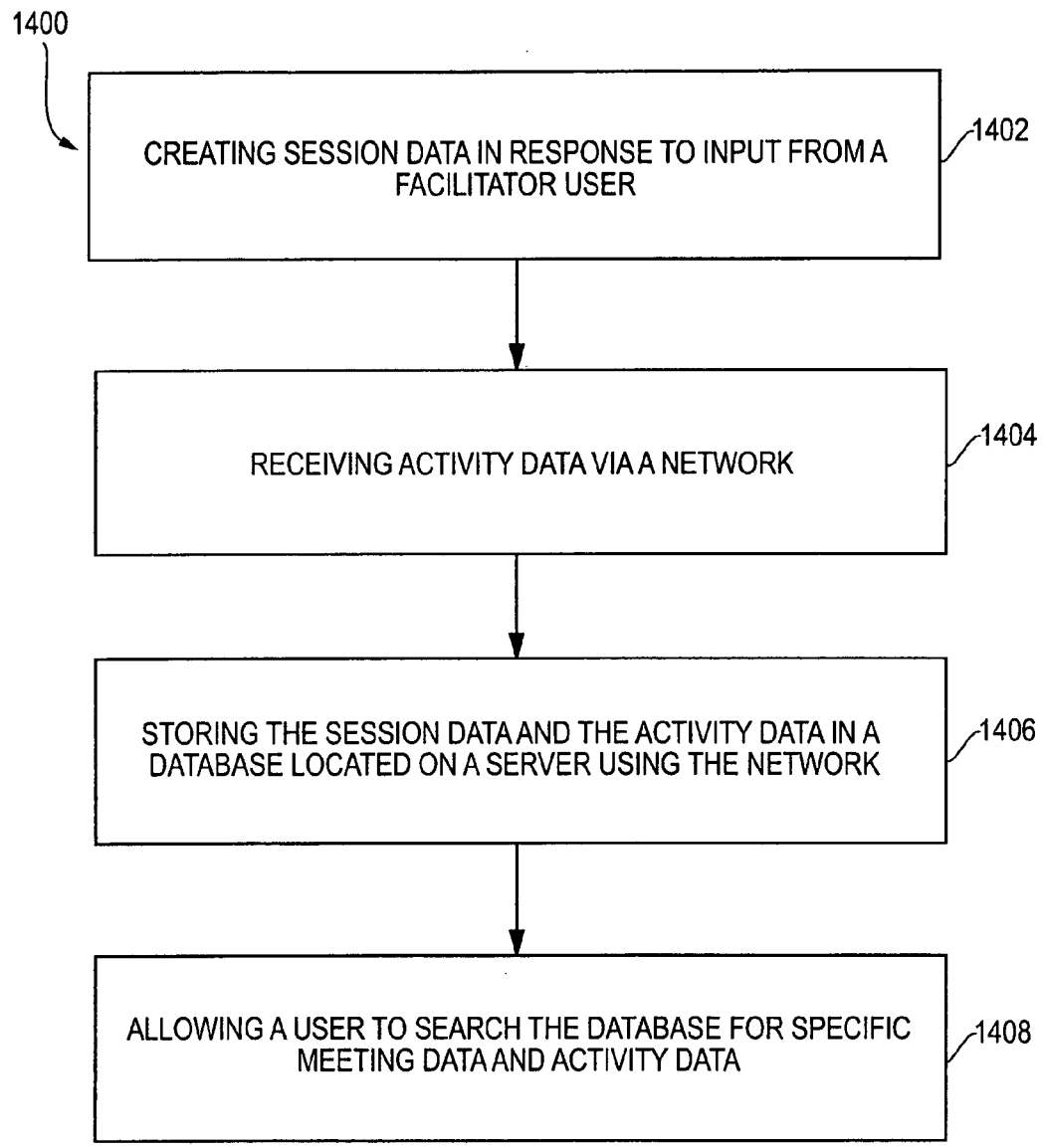
FIG. 14A is a flowchart illustrating a method for affording archiving in a collaborative work tool architecture, in accordance with an embodiment of the present invention.

FIG. 14A is a flowchart illustrating a method 1400 for affording archiving in a collaborative work tool architecture, in accordance with an embodiment of the present invention. First, in operation 1402, session data is created by a facilitator user. Then in operation 1404 activity data is received via the network. The session data and activity data are then stored in a database located on a server using the network, as indicated in operation 1406. Finally, a user is allowed to search the database for specific data, see operation 1408.

In one aspect of the present invention, the database further includes session reports. In another aspect, the user is allowed to search the database for a specific session report.

In one embodiment of the present invention, the session report is an HTML file. In another embodiment, the activity data is accessed by users asynchronously. Additionally, the collaborative work tool architecture may be distributed. Thus, the present invention allows archiving of session materials for later reference. Moreover, the present invention allows users to search the archived sessions for material they desire to use.

Figure 14B:
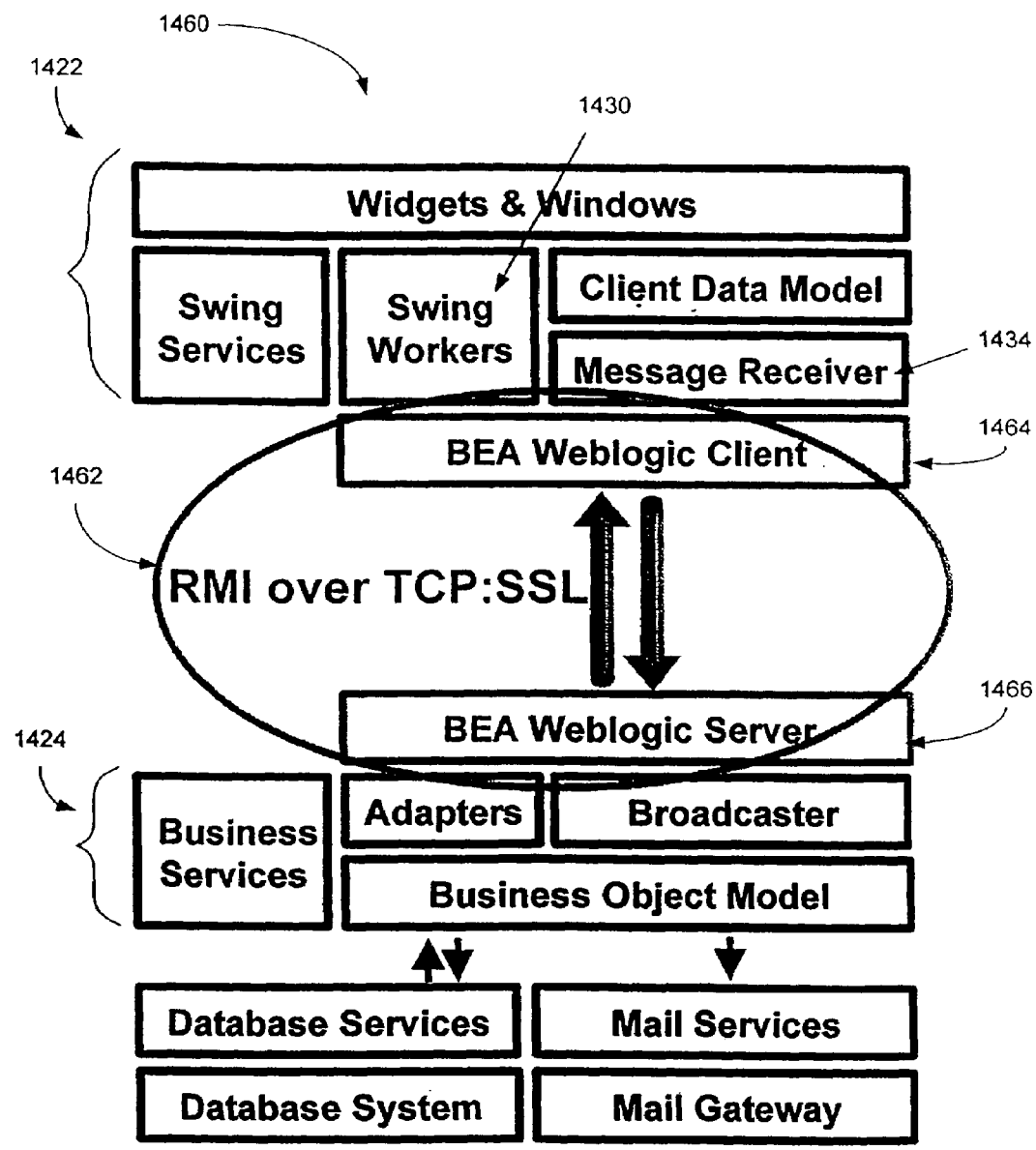
FIG. 14B is a diagram of a software architecture for a collaborative work tool, in accordance with an embodiment of the present invention.

FIG. 14B is a diagram of a software architecture 1420 for a collaborative work tool, in accordance with an embodiment of the present invention. The software architecture 1420 includes a client tier 1422, a business tier 1424, and a backend tier 1426.

The client tier 1422 includes swing services 1428, swing workers 1430, a client data model 1432, and message receiver 1434. Typically, the foregoing components execute in an operating system environment, such as Microsoft Windows 95/98 1436.

The business tier 1424 includes business services 1438, adapters 1440, a broadcaster 1442, and a business object model 1444. Generally, the adaptors 1440 of the business tier 1424 are utilized by the system to communicate with the swing workers 1430 of the client tier 1422.

The backend tier 1426 includes database services 1446, a database system 1448, mail services 1450, and a mail gateway 1452. In operation, the database services component 1446 is utilized by the system for bi-directional communicatation with the business object model 1444 of the business tier 1424. In addition, the mail services component 1450 provides mail services to the business object model of the business tier. Typically, the backend tier executes on a service operating system such as Microsoft Windows NT. To provide secure transactions, BEA weblogic is used for security between the client tier 1422 and the business tier 1424, as discussed in greater detail with reference to FIG. 14C.

Figure 14C:
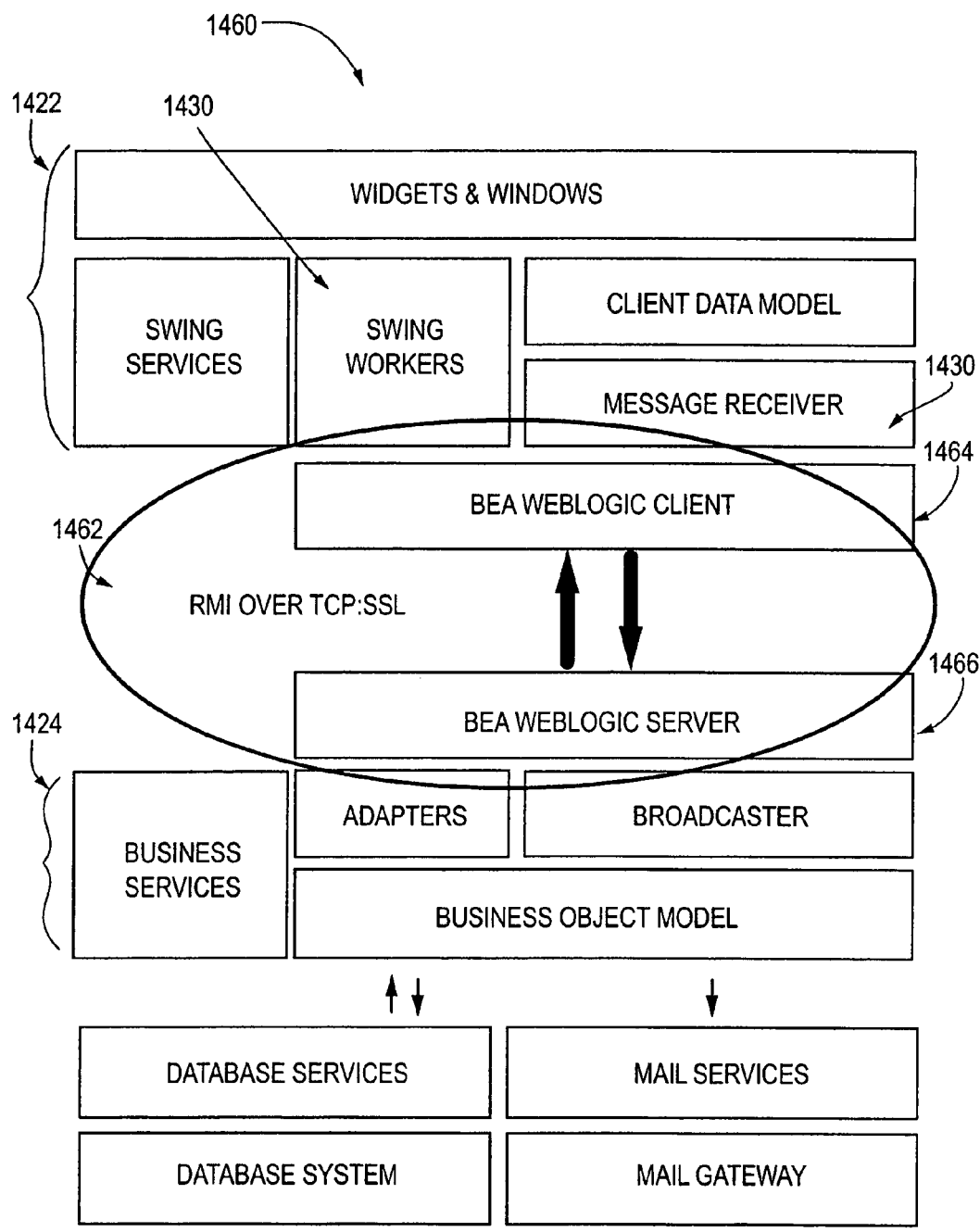
FIG. 14C is a diagram of a secure software architecture for a collaborative work tool, in accordance with an embodiment of the present invention.

FIG. 14C is a diagram of a secure software architecture 1460 for a collaborative work tool, in accordance with an embodiment of the present invention. The secure software architecture 1460 includes RMI over TCP:SSL security 1462 having BEA Weblogic client 1464 and BEA Weblogic server 1466.

As discussed previously, the client tier 1422 communicates with the business tier 1424 using the swing workers 1430 and the message receiver 1434 components. In this embodiment, the swing workers 1430 and the message receiver 1434 components communicate with the BEA Weblogic client 1464, which authenticates the user, generally via a userID and password. The BEA Weblogic server 1466 is then used for server authentication, generally by SSL using forty bits encryption.

Figure 15:
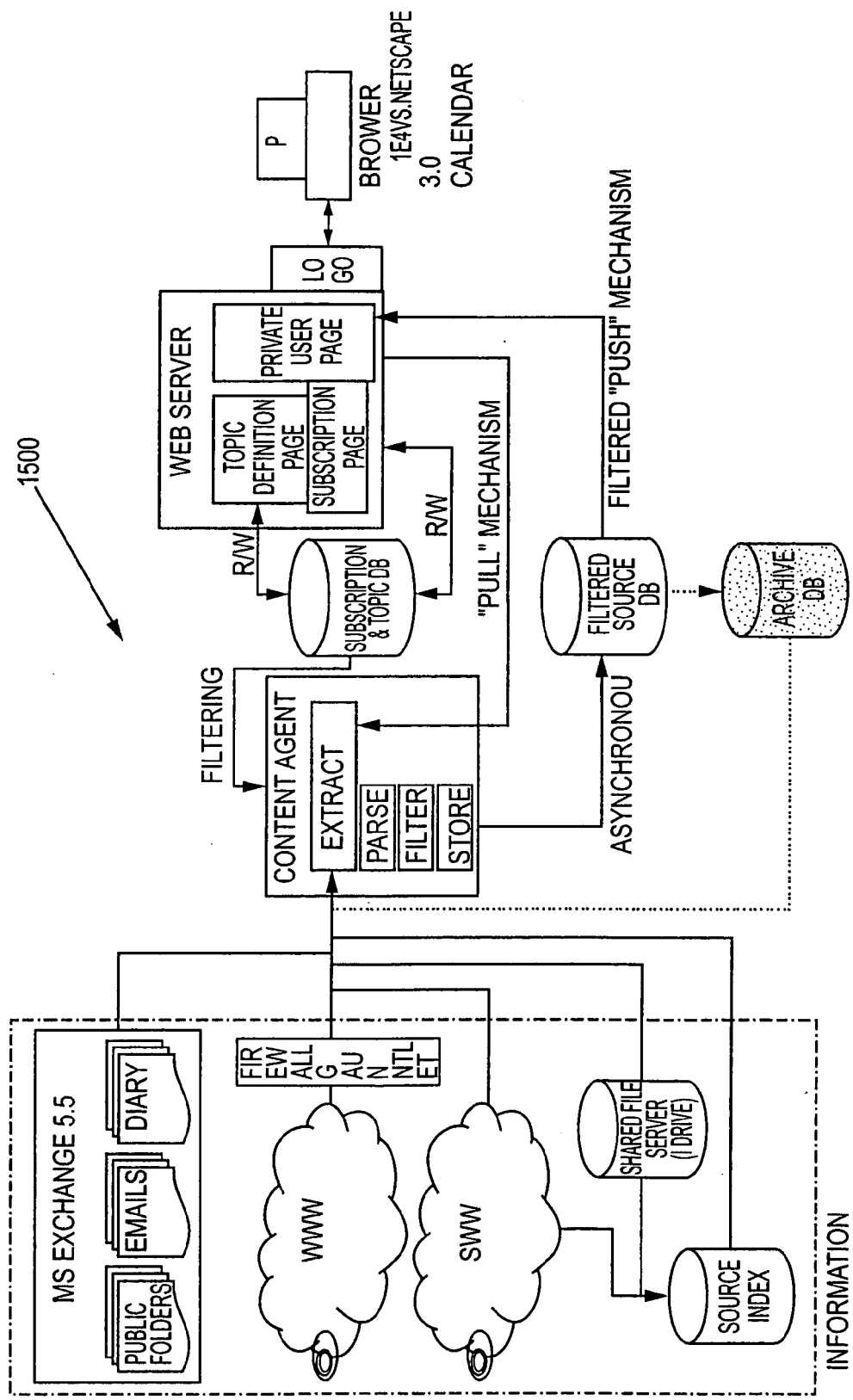
FIG. 15 is a schematic diagram of an exemplary system architecture in accordance with an embodiment of the present invention.

FIG. 15 is a schematic diagram of an exemplary system architecture 1500 in accordance with another embodiment of the present invention.

In accordance with an embodiment of the present invention, a BackgroundFinder (BF) is implemented as an agent responsible for preparing an individual for an upcoming meeting by helping him/her retrieve relevant information about the meeting from various sources. BF receives input text in character form indicative of the target meeting. The input text is generated in accordance with an embodiment of the present invention by a calendar program that includes the time of the meeting. As the time of the meeting approaches, the calendar program is queried to obtain the text of the target event and that information is utilized as input to the agent. Then, the agent parses the input meeting text to extract its various components such as title, body, participants, location, time etc. The system also performs pattern matching to identify particular meeting fields in a meeting text. This information is utilized to query various sources of information on the web and obtain relevant stories about the current meeting to send back to the calendaring system. For example, if an individual has a meeting with Netscape and Microsoft to talk about their disputes, and would obtain this initial information from the calendaring system. It will then parse out the text to realize that the companies in the meeting are "Netscape" and "Microsoft" and the topic is "disputes." Then, the system queries the web for relevant information concerning the topic. Thus, in accordance with an objective of the invention, the system updates the calendaring system and eventually the user with the best information it can gather to prepare the user for the target meeting. In accordance with an embodiment of the present invention, the information is stored in a file that is obtained via selection from a link imbedded in the calendar system.

Program Organization:

A computer program in accordance with an embodiment of the present invention is organized in five distinct modules: BF.Main, BF.Parse, Background Finder.Error, BF.Pattern-Matching and BF.Search. There is also a frmMain which provides a user interface used only for debugging purposes. The executable programs in accordance with an embodiment of the present invention never execute with the user interface and should only return to the calendaring system through Microsoft's Winsock control. An embodiment of the system executes in two different modes which can be specified under the command line sent to it by the calendaring system. When the system runs in simple mode, it executes a keyword query to submit to external search engines. When executed in complex mode, the system performs pattern matching before it forms a query to be sent to a search engine.

Data Structures:

The system in accordance with an embodiment of the present invention utilizes three user defined structures:

TMeetingRecord;

TPatternElement; and

TPatternRecord.

The user-defined structure, tMeetingRecord, is used to store all the pertinent information concerning a single meeting. This info includes userID, an original description of the meeting, the extracted list of keywords from the title and body of meeting etc. It is important to note that only one meeting record is created per instance of the system in accordance with an embodiment of the present invention. This is because each time the system is spawned to service an upcoming meeting, it is assigned a task to retrieve information for only one meeting. Therefore, the meeting record created corresponds to the current meeting examined. ParseMeetingText populates this meeting record and it is then passed around to provide information about the meeting to other functions.

If GoPatternMatch can bind any values to a particular meeting field, the corresponding entries in the meeting record is also updated. The structure of tMeetingRecord with each field described in parentheses is provided below in accordance with an embodiment of the present invention.

Public Type tMeetingRecord
    sUserID As String (user id given by Munin)
    sTitleOrig As String (original non stop listed title we need to keep around to send back to Munin)
    sTitleKW As String (stoplisted title with only keywords)
    sBodyKW As String (stoplisted body with only keywords)
    sCompany( ) As String (companies identified in title or body through pattern matching)
    sTopic( ) As String (topics identified in title or body through pattern matching)
    sPeople( ) As String (people identified in title or body through pattern matching)
    sWhen( ) As String (time identified in title or body through pattern matching)
    sWhere( ) As String (location identified in title or body through pattern matching)
    sLocation As String (location as passed in by Munin)
    sTime As String (time as passed in by Munin)
    sParticipants( ) As String (all participants engaged as passed in by Munin)
    sMeetingText As String (the original meeting text w/o userid)
End Type There are two other structures which are created to hold each individual pattern utilized in pattern matching. The record tAPatternRecord is an array containing all the components/elements of a pattern. The type tAPatternElement is an array of strings which represent an element in a pattern. Because there may be many "substitutes" for each element, we need an array of strings to keep track of what all the substitutes are. The structures of tAPatternElement and tAPatternRecord are presented below in accordance with an embodiment of the present invention.

Public Type tAPatternElement
    elementArray( ) As String

End Type

Public Type tAPatternRecord
    patternArray( ) As tAPatternElement

End Type

User Defined Constants:
    Many constants are defined in each declaration section of the program which may need to be updated periodically as part of the process of maintaining the system in accordance with an embodiment of the present invention. The constants are accessible to allow dynamic configuration of the system to occur as updates for maintaining the code.

Included in the following tables are lists of constants from each module which I thought are most likely to be modified from time to time. However, there are also other constants used in the code not included in the following list. It does not mean that these non-included constants will never be changed. It means that they will change much less frequently.

| For the Main Module (BF.Main): | | |
|---|---|---|
| CONSTANT | PRESET VALUE | USE |
| MSGTOMUNIN_TYPE | 6 | Define the message number used to identify messages between BF and Munin |
| IP_ADDRESS_MUNIN | "10.2.100.48" | Define the IP address of the machine in which Munin and BF are running on so they can transfer data through UDP. |
| PORT_MUNIN | 7777 | Define the remote port in which we are operating on. |
| TIMEOUT_AV | 60 | Define constants for setting time out in inet controls |
| TIMEOUT_NP | 60 | Define constants for setting time out in inet controls |
| CMD_SEPARATOR | "\" | Define delimiter to tell which part of Munin's command represents the beginning of our input meeting text. |
| OUTPARAM_SEPARATOR | "::" | Define delimiter for separating out different portions of the output. The separator is for delimiting the msg type, the user id, the meeting title and the beginning of the actual stories retrieved. |

| For the Search Module (BF.Search): | | |
|---|---|---|
| CONSTANT | CURRENT VALUE | USE |
| PAST_NDAYS | 5 | Define number of days you want to look back for AltaVista articles. Doesn't really matter now because we aren't really doing a news search in alta vista. We want all info. |
| CONNECTOR_AV_URL | "+AND+" | Define how to connect keywords. We want all our keywords in the string for now use AND. If you want to do an OR or something, just change connector. |
| CONNECTOR_NP_URL | "+AND+" | Define how to connect keywords. We want all our keywords in the string for now use AND. If you want to do an OR or something, just change connector. |
| NUM_NP_STORIES | 3 | Define the number of stories to return back to Munin from NewsPage. |

For the Search Module (BF.Search):

| CONSTANT | CURRENT VALUE | USE |
| --- | --- | --- |
| NUM_AV_STORIES | 3 | Define the number of stories to return back to Munin from AltaVista. |

For the Parse Module (BF.Parse):

| CONSTANT | CURRENT VALUE | USE |
| --- | --- | --- |
| PORTION_SEPARATOR | "::" | Define the separator between different portions of the meeting text sent in the Munin. For example in "09::Meet with Chad::about life::Chad \| Denise:::::  "::" is the separator between different parts of the meeting text. |
| PARTICIPANT_SEPARATOR | "\|" | Define the separator between each participant in the participant list portion of the original meeting text. Refer to example above. |

For Pattern Matching Module (BFPatternMatch): There are no constants in this module which require frequent updates.

Figure 16:
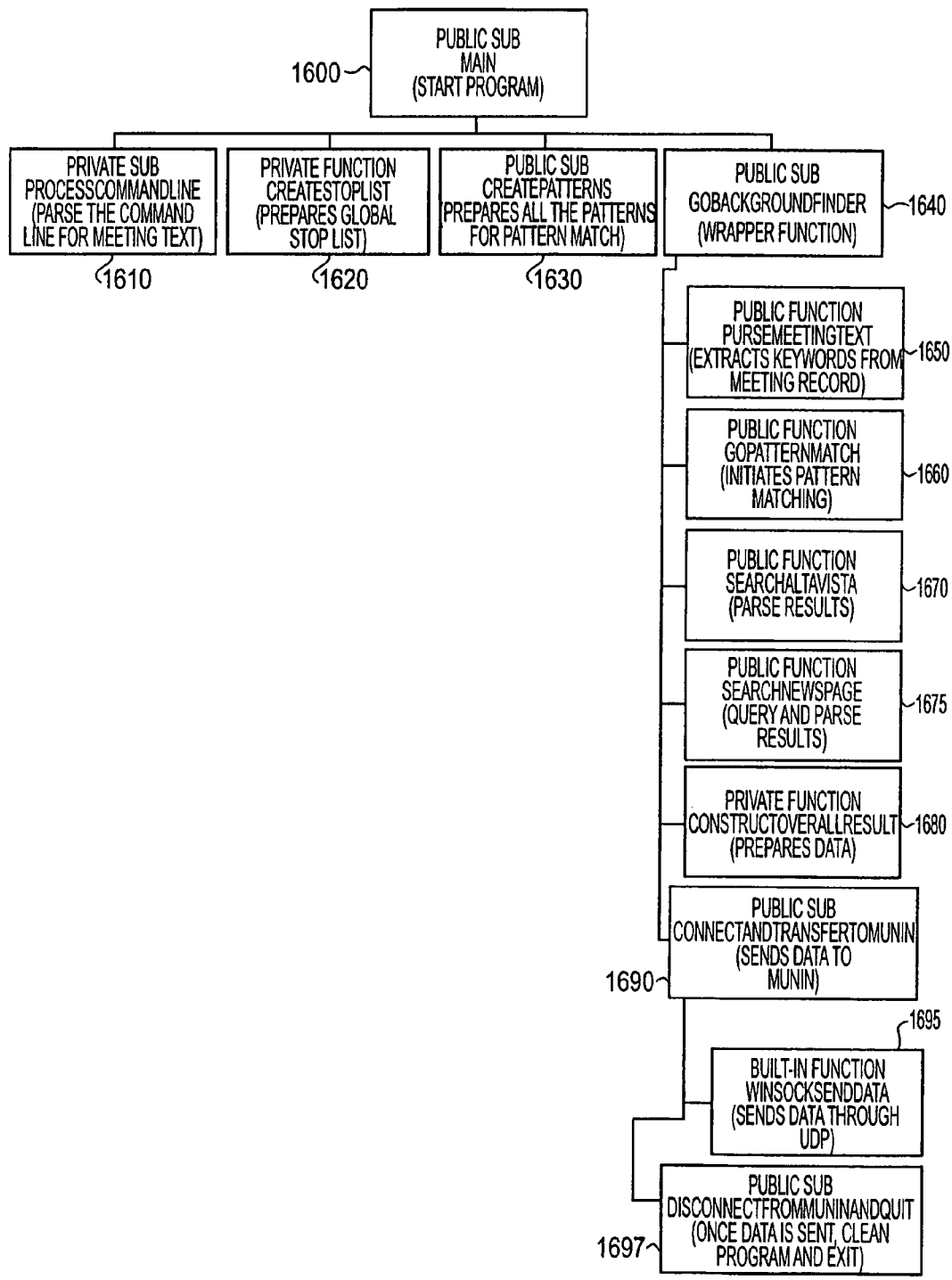
FIG. 16 depicts the overall process flow in accordance with an embodiment of the present invention.

General Process Flow:

The best way to depict the process flow and the coordination of functions between each other is with the five flowcharts illustrated in FIGS. 16 to 20. FIG. 16 depicts the overall process flow in accordance with an embodiment of the present invention. Processing commences at the top of the chart at function block 1600 which launches when the program starts. Once the application is started, the command line is parsed to remove the appropriate meeting text to initiate the target of the background find operation in accordance with an embodiment of the present invention as shown in function block 1610. A global stop list is generated after the target is determined as shown in function block 1620. Then, all the patterns that are utilized for matching operations are generated as illustrated in function block 1630. Then, by tracing through the chart, function block 1600 invokes GoBF 1640 which is responsible for logical processing associated with wrapping the correct search query information for the particular target search engine (function blocks 1650–1697). For example, function block 1640 flows to function block 1650 and it then calls GoPatternMatch as shown in function block 1660. To see the process flow of GoPatternMatch, we swap to the diagram titled "Process Flow for BF's Pattern Matching Unit."

One key thing to notice is that functions depicted at the same level of the chart are called by in sequential order from left to right (or top to bottom) by their common parent function. For example, Main 1600 calls ProcessCommandLine 1610, then CreateStopListist 1620, then CreatePatterns 1630, then GoBackgroundFinder 1640. FIGS. 17 to 20 detail the logic for the entire program, the parsing unit, the pattern matching unit and the search unit respectively. FIG. 20 details the logic determinative of data flow of key information through BackgroundFinder, and shows the functions that are responsible for creating or processing such information.

Search Architecture Under the Basic Search/Simple Query Mode

Search ALTA VISTA:

As described in more detail herein, the Alta Vista search engine utilizes the identities and returns general information about topics related to the current meeting as shown in FIG. 20. The system in accordance with an embodiment of the present invention takes all the keywords from the title portion of the original meeting text and constructs an advanced query to send to Alta Vista. The keywords are logically combined together in the query. The results are also ranked based on the same set of keywords. One of ordinary skill in the art will readily comprehend that a date restriction or publisher criteria could be facilitated on the articles we want to retrieve. A set of top ranking stories are returned to the calendaring system in accordance with an embodiment of the present invention.

NewsPage (Function Block 1675 of FIG. 16):

The NewsPage search system is responsible for giving us the latest news topics related to a target meeting. The system takes all of the keywords from the title portion of the original meeting text and constructs a query to send to the NewsPage search engine. The keywords are logically combined together in the query. Only articles published recently are retrieved. The NewsPage search system provides a date restriction criteria that is settable by a user according to the user's preference. The top ranking stories are returned to the calendaring system.

Figure 17:
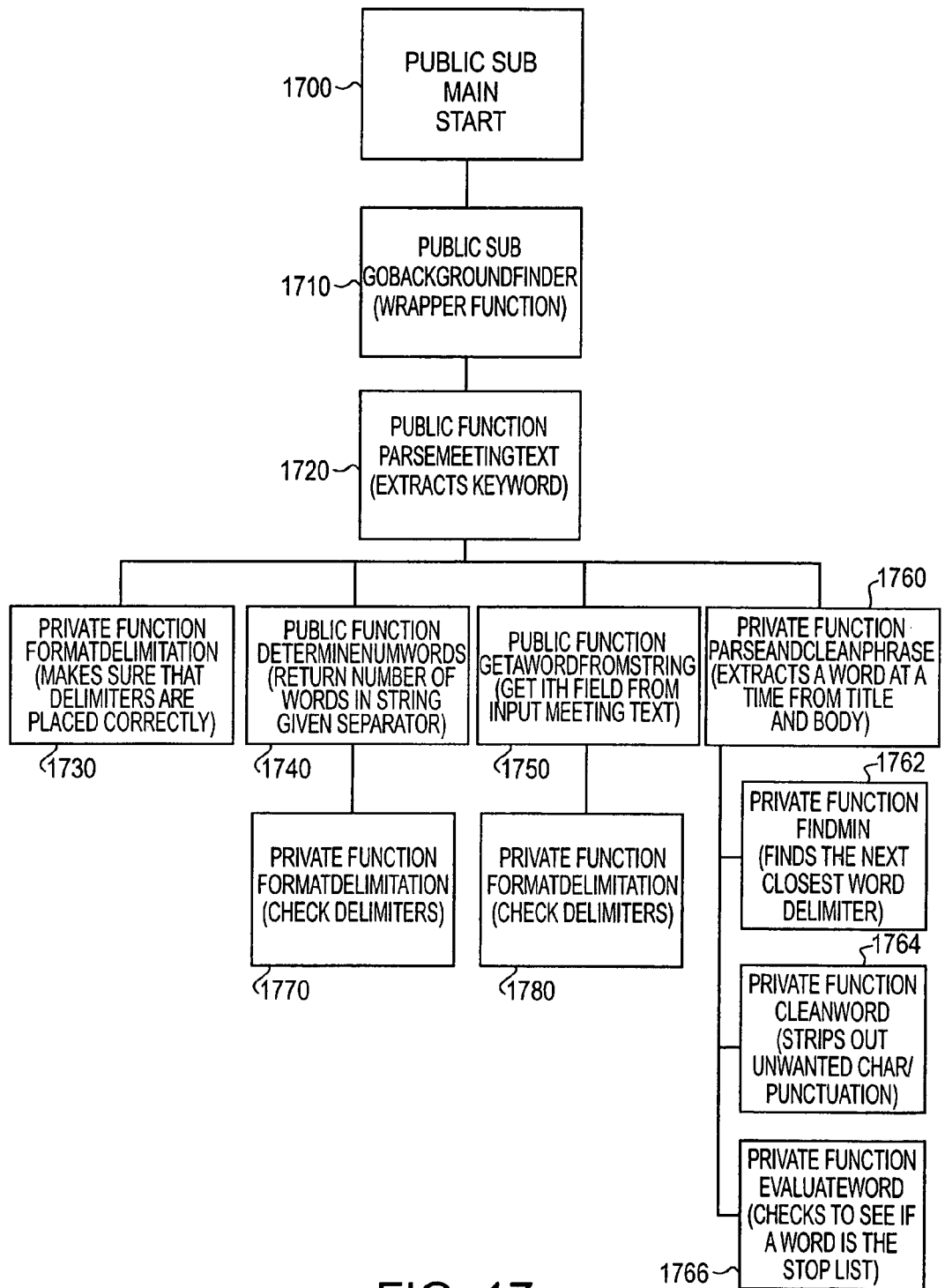
FIG. 17 is a user profile data model in accordance with an embodiment of the present invention.

FIG. 17 is a user profile data model in accordance with an embodiment of the present invention. Processing commences at function block 1700 which is responsible for invoking the program from the main module. Then, at function block 1710, a wrapper function is invoked to prepare for the keyword extraction processing in function block 1720. After the keywords are extracted, then processing flows to function block 1730 to determine if the delimiters are properly positioned. Then, at function block 1740, the number of words in a particular string is calculated, at function block 1770 the delimiters for the particular field are checked, and a particular field from the meeting text is retrieved at function block 1750. Then, at function block 1780, the delimiters of the string are again checked to assure they are placed appropriately. Finally, at function block 1760, the extraction of each word from the title and body of the message is performed a word at a time utilizing the logic in function block 1762 which finds the next closest word delimiter in the input phrase, function block 1764 which strips unnecessary materials from a word and function block 1766 which determines if a word is on the stop list and returns an error if the word is on the stop list.

Pattern Matching:

Limitations associated with a simple searching method include:

1. Because it relies on a stop list of unwanted words in order to extract from the meeting text a set of keywords, it is limited by how comprehensive the stop list is. Instead of trying to figure out what parts of the meeting text we should throw away, we should focus on what parts of the meeting text we want.

2. A simple search method in accordance with an embodiment of the present invention only uses the keywords from a meeting title to form queries to send to Alta Vista and NewsPage. This ignores an alternative source of information for the query, the body of the meeting notice. We cannot include the keywords from the meeting body to form our queries because this often results in queries which are too long and so complex that we often obtain no meaningful results.
3. There is no way for us to tell what each keyword represents. For example, we may extract "Andy" and "Grove" as two keywords. However, a simplistic search has no way knowing that "Andy Grove" is in fact a person's name. Imagine the possibilities if we could somehow intelligently guess that "Andy Grove" is a person's name. We can find out if he is an Andersen person and if so what kind of projects he's been on before etc. etc.
4. In summary, by relying solely on a stop list to parse out unnecessary words, we suffer from "information overload".

Pattern Matching Overcomes these Limitations:

Here's how the pattern matching system can address each of the corresponding issues above in accordance with an embodiment of the present invention.
1. By doing pattern matching, we match up only parts of the meeting text that we want and extract those parts.
2. By performing pattern matching on the meeting body and extracting only the parts from the meeting body that we want. Our meeting body will not go to complete waste then.
3. Pattern matching is based on a set of templates that we specify, allowing us to identify people names, company names etc from a meeting text.
4. In summary, with pattern matching, we no longer suffer from information overload. Of course, the big problem is how well our pattern matching works. If we rely exclusively on artificial intelligence processing, we do not have a 100% hit rate. We are able to identify about 20% of all company names presented to us.

Patterns:

A pattern in the context of an embodiment of the present invention is a template specifying the structure of a phrase we are looking for in a meeting text. The patterns supported by an embodiment of the present invention are selected because they are templates of phrases which have a high probability of appearing in someone's meeting text. For example, when entering a meeting in a calendar, many would write something such as "Meet with Bob Dutton from Stanford University next Tuesday." A common pattern would then be something like the word "with" followed by a person's name (in this example it is Bob Dutton) followed by the word "from" and ending with an organization's name (in this case, it is Stanford University).

Pattern Matching Terminology:

Terminology associated with pattern matching includes:

Pattern: a pattern is a template specifying the structure of a phrase we want to bind the meeting text to. It contains sub units.

Element: a pattern can contain many sub-units. These subunits are called elements. For example, in the pattern "with $PEOPLE$ from $COMPANY$", "with" "$PEOPLE$" "from" "$COMPANY$" are all elements.

Placeholder: a placeholder is a special kind of element in which we want to bind a value to. Using the above example, "$PEOPLE$" is a placeholder.

Indicator: an indicator is another kind of element which we want to find in a meeting text but no value needs to bind to it. There may be often more than one indicator we are looking for in a certain pattern. That is why an indicator is not an "atomic" type.

Substitute: substitutes are a set of indicators which are all synonyms of each other. Finding any one of them in the input is good.

There may be Five Fields which are Identified for Each Meeting:

Company ($COMPANY$)
People ($PEOPLE$)
Location ($LOCATION$)
Time ($TIME$)
Topic ($TOPIC_UPPER$) or ($TOPIC_ALL$)

In parentheses are the illustrative placeholders used in the code as representation of the corresponding meeting fields.

Each placeholder may have the following meaning:

$COMPANY$: binds a string of capitalized words (e.g., Meet with Joe Carter of <Andersen Consulting>)

$PEOPLE$: binds series of string of two capitalized words potentially connected by "," "and" or "&" (e.g., Meet with <Joe Carter> of Andersen Consulting, Meet with <Joe Carter and Luke Hughes> of Andersen Consulting)

$LOCATION$: binds a string of capitalized words (e.g., Meet Susan at <Palo Alto Square>)

$TIME$: binds a string containing the format #:## (e.g., Dinner at <6:30 pm>)

$TOPIC_UPPER$: binds a string of capitalized words for our topic (e.g., <Stanford Engineering Recruiting> Meeting to talk about new hires).

$TOPIC_ALL$: binds a string of words without really caring if it's capitalized or not. (e.g., Meet to talk about <ubiquitous computing>)

The following table represents patterns supported by BF. Each pattern belongs to a pattern group. All patterns within a pattern group share a similar format and they only differ from each other in terms of what indicators are used as substitutes. Note that the patterns which are grayed out are also commented in the code. BF has the capability to support these patterns but we decided that matching these patterns is not essential at this point.

| 1 | 1.1.1.1.1.1 | $PEOPLE$ of $COMPANY$ | Paul Maritz of Microsoft |
|---|---|---|---|
|   | b | $PEOPLE$ from $COMPANY$ | Bill Gates, Paul Allen and Paul Maritz from Microsoft |
| 2 | a | $TOPIC_UPPER$ meeting | Push Technology Meeting |
|   | b | $TOPIC_UPPER$ mtg | Push Technology Mtg |
|   | c | $TOPIC_UPPER$ demo | Push Technology demo |
|   | d | $TOPIC_UPPER$ interview | Push Technology interview |
|   | e | $TOPIC_UPPER$ presentation | Push Technology presentation |
|   | f | $TOPIC_UPPER$ visit | Push Technology visit |
|   | g | $TOPIC_UPPER$ briefing | Push Technology briefing |
|   | h | $TOPIC_UPPER$ discussion | Push Technology discussion |

-continued

| | | | |
|---|---|---|---|
| | i | $TOPIC_UPPER$ workshop | Push Technology workshop |
| | j | $TOPIC_UPPER$ prep | Push Technology prep |
| | k | $TOPIC_UPPER$ review | Push Technology review |
| | l | $TOPIC_UPPER$ lunch | Push Technology lunch |
| | m | $TOPIC_UPPER$ project | Push Technology project |
| | n | $TOPIC_UPPER$ projects | Push Technology projects |
| 3 | a | $COMPANY$ corporation | Intel Corporation |
| | b | $COMPANY$ corp. | IBM Corp. |
| | c | $COMPANY$ systems | Cisco Systems |
| | d | $COMPANY$ limited | IBM limited |
| | e | $COMPANY$ ltd | IBM ltd |
| 4 | a | about $TOPIC_ALL$ | About intelligent agents technology |
| | b | discuss $TOPIC_ALL$ | Discuss intelligent agents technology |
| | c | show $TOPIC_ALL$ | Show the client our intelligent agents technology |
| | d | re: $TOPIC_ALL$ | re: intelligent agents technology |
| | e | review $TOPIC_ALL$ | Review intelligent agents technology |
| | f | agenda | The agenda is as follows: clean up clean up clean up |
| | g | agenda: $TOPIC_ALL$ | Agenda: demo client intelligent agents technology. demo ecommerce. |
| 5 | a | w/$PEOPLE$ of $COMPANY$ | Meet w/Joe Carter of Andersen Consulting |
| | b | w/$PEOPLE$ from $COMPANY$ | Meet w/Joe Carter from Andersen Consulting |
| 6 | a | w/$COMPANY$ per $PEOPLE$ | Talk w/Intel per Jason Foster |
| 7 | a | At $TIME$ | at 3:00 pm |
| | b | Around $TIME$ | Around 3:00 pm |
| 8 | a | At $LOCATION$ | At LuLu's restaurant |
| | b | In $LOCATION$ | in Santa Clara |
| 9 | a | Per $PEOPLE$ | per Susan Butler |
| 10 | a | call w/$PEOPLE$ | Conf call w/John Smith |
| | B | call with $PEOPLE$ | Conf call with John Smith |
| 11 | A | prep for $TOPIC_ALL$ | Prep for London meeting |
| | B | preparation for $TOPIC_ALL$ | Preparation for London meeting |

Figure 18:
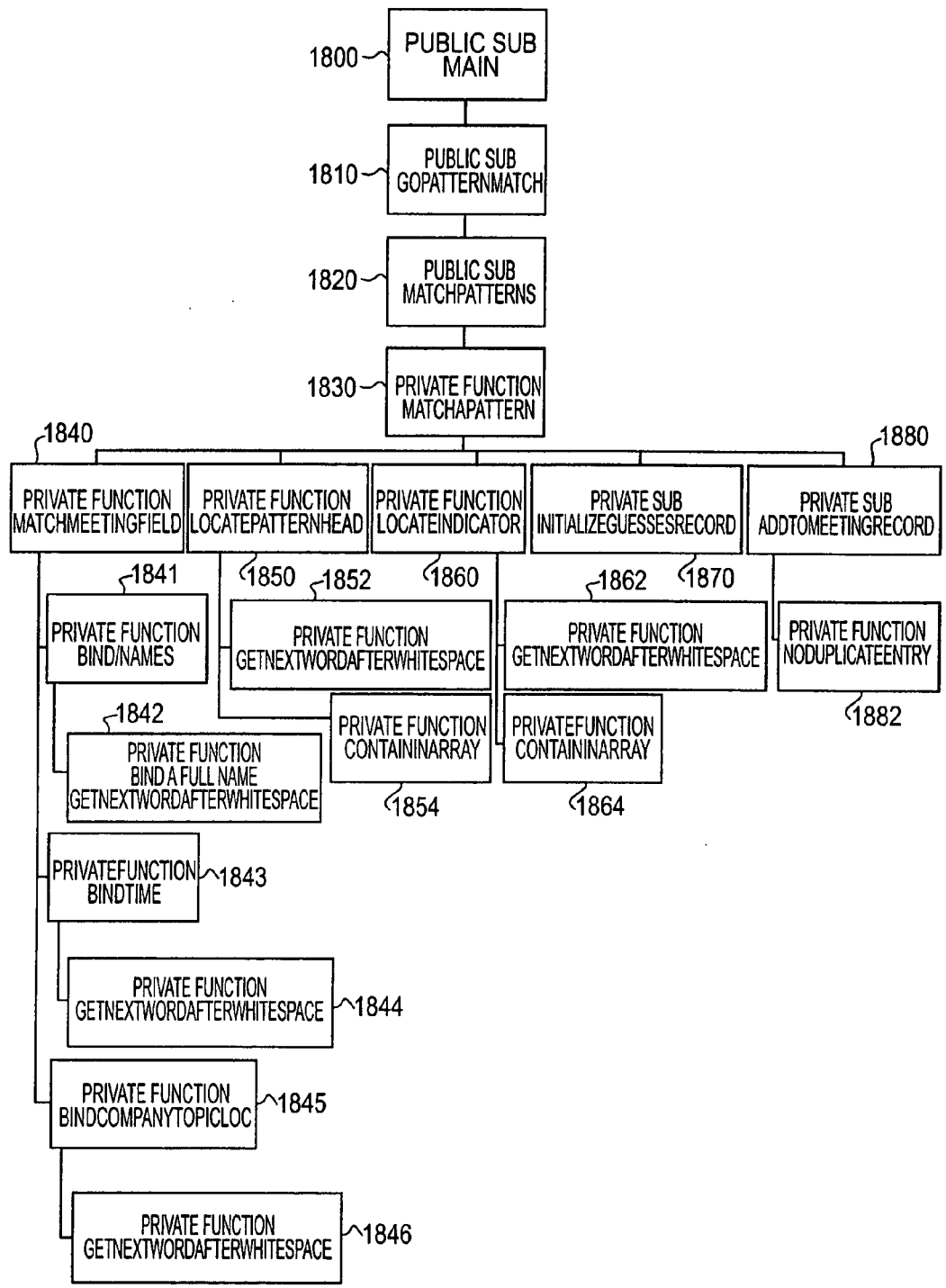
FIG. 18 is a detailed flowchart of pattern matching in accordance with an embodiment of the present invention.

FIG. 18 is a detailed flowchart of pattern matching in accordance with an embodiment of the present invention. Processing commences at function block 1800 where the main program invokes the pattern matching application and passes control to function block 1810 to commence the pattern match processing. Then, at function block 1820, the wrapper function loops through to process each pattern which includes determining if a part of the text string can be bound to a pattern as shown in function block 1830. Then, at function block 1840, various placeholders are bound to values if they exist, and in function block 1841, a list of names separated by punctuation are bound, and at function block 1842 a full name is processed by finding two capitalized words as a full name and grabbing the next letter after a space after a word to determine if it is capitalized. Then, at function block 1843, time is parsed out of the string in an appropriate manner and the next word after a blank space in function block 1844. Then, at function block 1845, the continuous phrases of capitalized words such as company, topic or location are bound and in function block 1846, the next word after the blank is obtained for further processing in accordance with an embodiment of the present invention. Following the match meeting field processing, function block 1850 is utilized to locate an indicator which is the head of a pattern, the next word after the blank is obtained as shown in function block 1852 and the word is checked to determine if the word is an indicator as shown in function block 1854. Then, at function block 1860, the string is parsed to locate an indicator which is not at the end of the pattern and the next word after unnecessary white space such as that following a line feed or a carriage return is processed as shown in function block 1862 and the word is analyzed to determine if it is an indicator as shown in function block 1864. Then, in function block 1870, the temporary record is reset to the null set to prepare it for processing the next string and at function block 1880, the meeting record is updated and at function block 1882 a check is performed to determine if an entry is already made to the meeting record before parsing the meeting record again.

Using the Identified Meeting Fields:

Now that we have identified fields within the meeting text which we consider important, there are quite a few things we can do with it. One of the most important applications of pattern matching is of course to improve the query we construct which eventually gets submitted to Alta Vista and News Page. There are also a lot of other options and enhancements which exploit the results of pattern matching that we can add to BF. These other options will be described in the next section. The goal of this section is to give the reader a good sense of how the results obtained from pattern matching can be used to help us obtain better search results.

Figure 19:
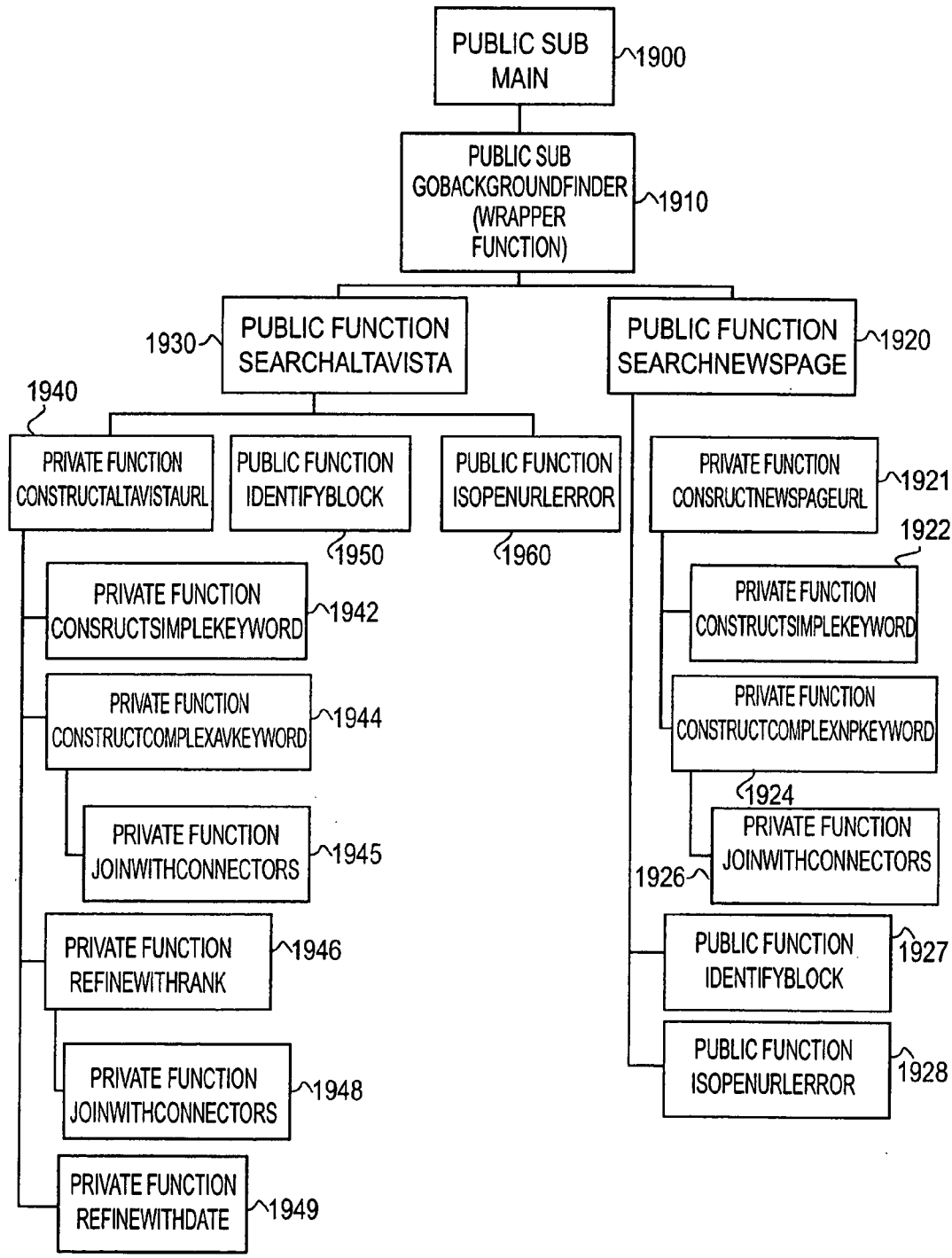
FIG. 19 shows a flowchart of the detailed processing for preparing a query and obtaining information from the Internet in accordance with an embodiment of the present invention.
Figure 20:
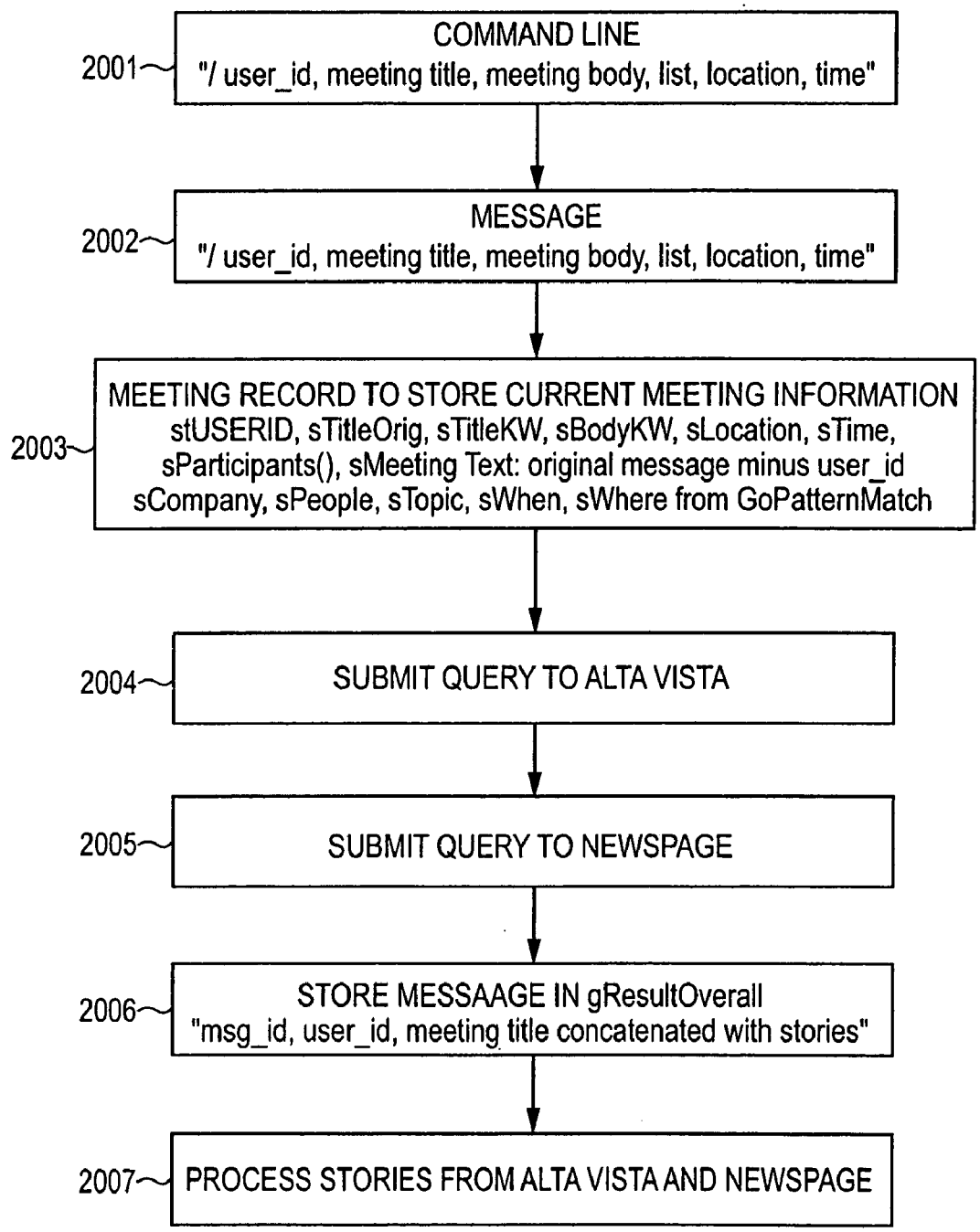
FIG. 20 shows a flowchart of the actual code utilized to prepare and submit searches to the Alta Vista and NewsPage search engines in accordance with an embodiment of the present invention.

FIG. 19 shows a flowchart of the detailed processing for preparing a query and obtaining information from the Internet in accordance with an embodiment of the present invention. Processing commences at function block 1900 and immediately flows to function block 1910 to process the wrapper functionality to prepare for an Internet search utilizing a web search engine. If the search is to utilize the Alta Vista search engine, then at function block 1930, the system takes information from the meeting record and forms a query in function blocks 1940 (including blocks 1942–1949), 1950, and 1960 for submittal to the search engine. If the search is to utilize the NewsPage search engine, then at function block 1920, the system takes information from the meeting record and forms a query in function blocks 1921 to 1928.

Alta Vista Search Engine:

A strength of the Alta Vista search engine is that it provides enhanced flexibility. Using its advance query method, one can construct all sorts of Boolean queries and rank the search however you want. However, one of the biggest drawbacks with Alta Vista is that it is not very good at handling a large query and is likely to give back irrelevant results. If we can identify the topic and the company within a meeting text, we can form a pretty short but comprehensive query which will hopefully yield better results. We also want to focus on the topics found. It may not be of much merit to the user to find out info about a company especially if the user already knows the company well and has had numerous meetings with them. It's the topics they want to research on.

Figure 21:
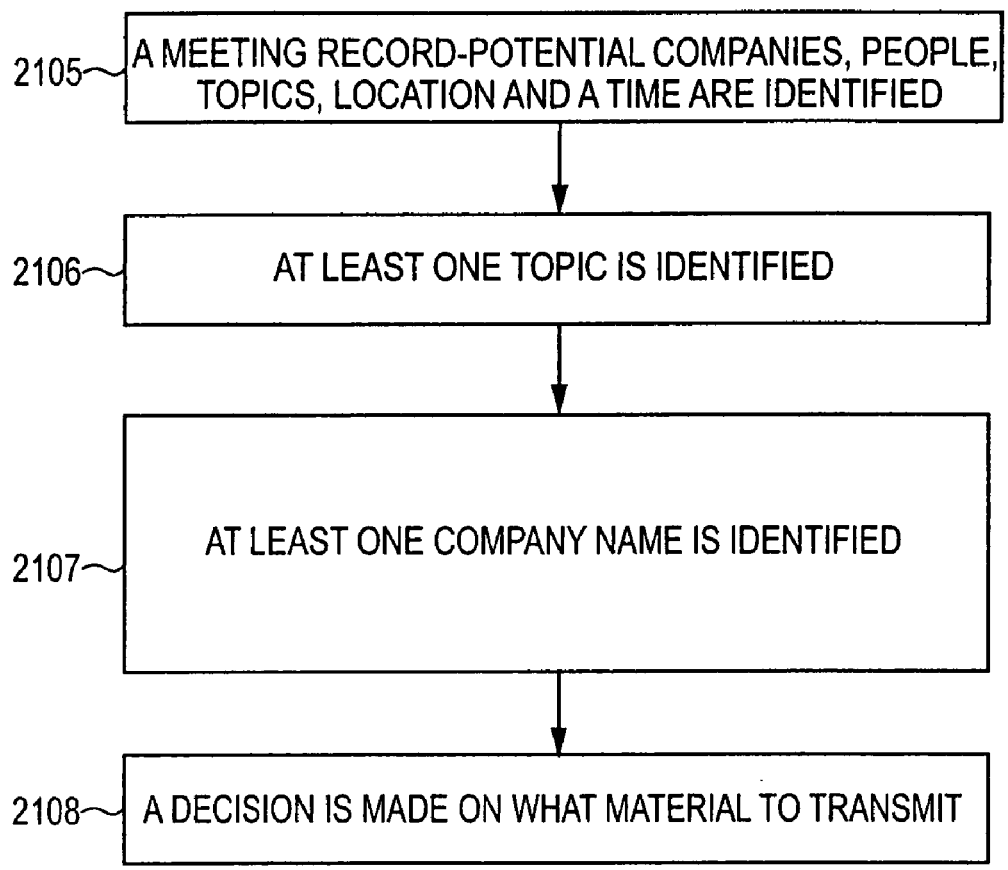
FIG. 21 provides more detail on creating the query in accordance with an embodiment of the present invention.
Figure 22:
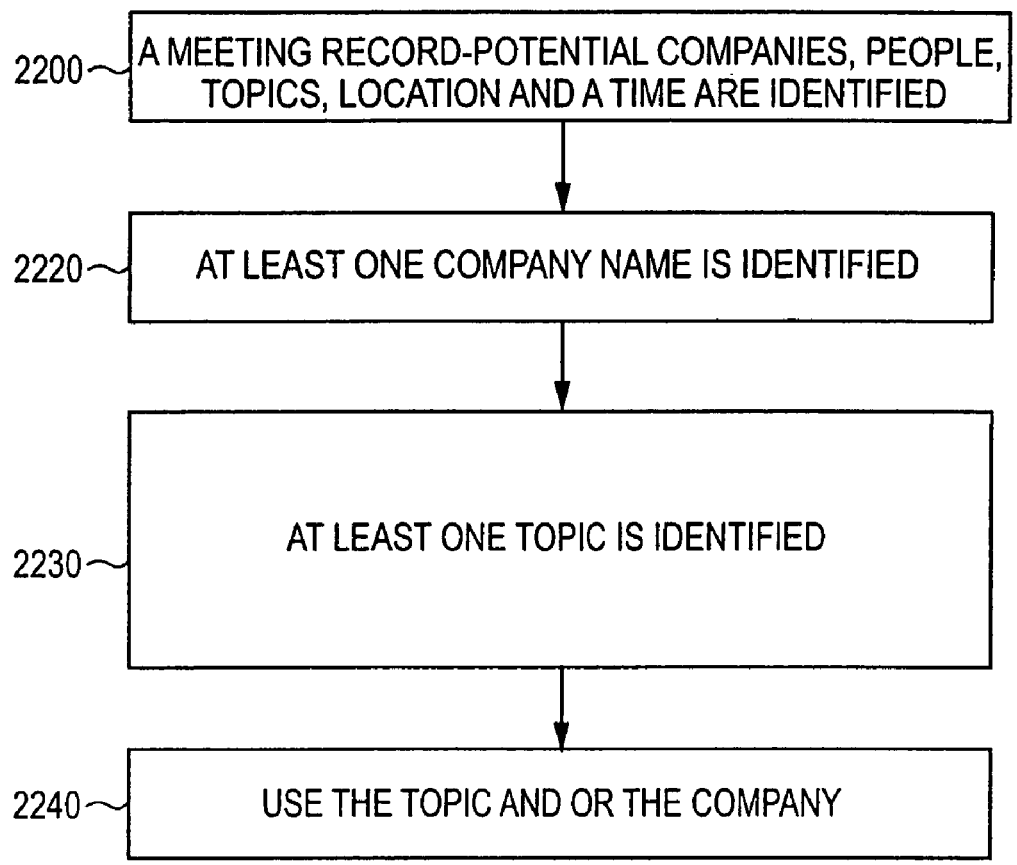
FIG. 22 is a variation on the query theme presented in FIG. 21.

News Page Search Engine:

A strength of the News Page search engine is that it does a great job searching for the most recent news if you are able to give it a valid company name. Therefore when we submit a query to the news page web site, we send whatever company name we can identify and only if we cannot find one do we use the topics found to form a query. If neither one is found, then no search is performed. The algorithm utilized to form the query to submit to Alta Vista is illustrated in FIG. 21. The algorithm that we will use to form the query to submit to News Page is illustrated in FIG. 22.

The following table describes in detail each function in accordance with an embodiment of the present invention. The order in which functions appear mimics the process flow as closely as possible. When there are situations in which a function is called several times, this function will be listed after the first function which calls it and its description is not duplicated after every subsequent function which calls it.

| | | | |
|---|---|---|---|
| Main (BF.Main) | Public Sub | None | This is the main function where the program first launches. It initializes BF with the appropriate parameters (e.g. Internet time-out, stoplist . . . ) and calls GoBF to launch the main part of the program. |
| ProcessCommandLine (BF.Main) | Private Sub | Main | This function parses the command line. It assumes that the delimiter indicating the beginning of input from Munin is stored in the constant CMD_SEPARATOR. |
| CreateStopList (BF.Main) | Private Function | Main | This function sets up a stop list for future use to parse out unwanted words from the meeting text. There are commas on each side of each word to enable straight checking. |
| CreatePatterns (BF.Pattern Match) | Public Sub | Main | This procedure is called once when BF is first initialized to create all the potential patterns that portions of the meeting text can bind to. A pattern can contain however many elements as needed. There are two types of elements. The first type of elements are indicators. These are real words which delimit the potential of a meeting field (e.g. company) to follow. Most of these indicators are stop words as expected because stop words are words usually common to all meeting text so it makes sense they form patterns. The second type of elements are special strings which represent placeholders. A placeholder is always in the form of $*$ where * can be either PEOPLE, COMPANY, TOPIC_UPPER, TIME, LOCATION or TOPIC_ALL. A pattern can begin with either one of the two types of elements and can be however long, involving however any number/type of elements. This procedure dynamically creates a new pattern record for |

| | | | |
|---|---|---|---|
| | | | each pattern in the table and it also dynamically creates new tAPatternElements for each element within a pattern. In addition, there is the concept of being able to substitute indicators within a pattern. For example, the pattern $PEOPLE$ of $COMPANY$ is similar to the pattern $PEOPLE$ from $COMPANY$. "from" is a substitute for "of". Our structure should be able to express such a need for substitution. |
| GoBF (BF.Main) | Public Sub | Main | This is a wrapper proceduror that calls both the parsing and the searching subroutines of the BF. It is also responsible for sending data back to Munin. |
| ParseMeetingText (BF.Parse) | Public Function | GoBackGroundFinder | This function takes the initial meeting text and identifies the userID of the record as well as other parts of the meeting text including the title, body, participant list, location and time. In addition, we call a helper function ProcessStopList to eliminate all the unwanted words from the original meeting title and meeting body so that only keywords are left. The information parsed out is stored in the MeetingRecord structure. Note that this function does no error checking and for the most time assumes that the meeting text string is correctly formatted by Munin. The important variable is thisMeeting Record is the temp holder for all info regarding current meeting. It's eventually returned to caller. |
| FormatDelimitation (BF.Parse) | Private | ParseMeetingText, DetermineNum Words, GetAWordFrom String | There are 4 ways in which the delimiters can be placed. We take care of all these cases by reducing them down to Case 4 in which there are no delimiters around but only between fields in a string (e.g. A::B::C) |
| DetermineNumWords (BF.Parse) | Public Function | ParseMeeting Text, ProcessStop List | This functions determines how many words there are in a string (stInEvalString) The function assumes that each word is separated by a designated separator as specified in stSeparator. The return type is an integer that indicates how many words have been found assuming each word in the string is separated by stSeparator. This function is always used along with GetAWordFromString and should be called before calling GetAWordFrom String. |
| GetAWordFromString (BF.Parse) | Public Function | ParseMeeting Text, | This function extracts the ith word of the |

| | | | |
|---|---|---|---|
| | | ProcessStop List | string(stInEvalString) assuming that each word in the string is separated by a designated separator contained in the variable stSeparator. In most cases, use this function with DetermineNumWords. The function returns the wanted word. This function checks to make sure that iInWordNum is within bounds so that i is not greater than the total number of words in string or less than/equal to zero. If it is out of bounds, we return empty string to indicate we can't get anything. We try to make sure this doesn't happen by calling DetermineNumWords first. |
| ParseAndCleanPhrase (BF.Parse) | Private Function | ParseMeetingText | This function first grabs the word and send it to CleanWord in order strip the stuff that nobody wants. There are things in parseWord that will kill the word, so we will need a method of looping through the body and rejecting words without killing the whole function i guess keep CleanWord and check a return value ok, now I have a word so I need to send it down the parse chain. This chain goes ParseCleanPhrase → CleanWord → EvaluateWord. If the word gets through the entire chain without being killed, it will be added at the end to our keyword string. first would be the function that checks for "A" as a delimiter and extracts the parts of that. This I will call "StitchFace" (Denise is more normal and calls it GetAWordFromString) if this finds words, then each of these will be sent, in turn, down the chain. If these get through the entire chain without being added or killed then they will be added rather than tossed. |
| FindMin (BF.Parse) | Private Function | ParseAndCleanPhrase | This function takes in 6 input values and evaluates to see what the minimum non zero value is. It first creates an array as a holder so that we can sort the five input values in ascending order. Thus the minimum value will be the first non zero value element of the array. If we go through entire array without finding a non zero value, we know that there is an error and we exit the function. |
| CleanWord (BF.Parse) | Private Function | ParseAndCleanPhrase | This function tries to clean up a word in a meeting text. It first of all determines if the string is of a valid length. It |

| | | | |
|---|---|---|---|
| EvaluateWord (BF.Parse) | Private Function | ParseAndCleanPhrase | then passes it through a series of tests to see it is clean and when needed, it will edit the word and strip unnecessary characters off of it. Such tests includes getting rid of file extensions, non chars, numbers etc. This function tests to see if this word is in the stop list so it can determine whether to eliminate the word from the original meeting text. If a word is not in the stoplist, it should stay around as a keyword and this function exits beautifully with no errors. However, if the words is a stopword, an error must be returned. We must properly delimit the input test string so we don't accidentally retrieve sub strings. |
| GoPatternMatch (BF.Pattern Match) | Public Sub | GoBF | This procedure is called when our QueryMethod is set to complex query meaning we do want to do all the pattern matching stuff. It's a simple wrapper function which initializes some arrays and then invokes pattern matching on the title and the body. |
| MatchPatterns (BF.Pattern Match) | Public Sub | GoPattern Match | This procedure loops through every pattern in the pattern table and tries to identify different fields within a meeting text specified by sInEvalString. For debugging purposes it also tries to tabulate how many times a certain pattern was triggered and stores it in gTabulateMatches to see whichp pattern fired the most. gTabulateMatches is stored as a global because we want to be able to run a batch file of 40 or 50 test strings and still be able to know how often a pattern was triggered. |
| MatchAPattern (BF.Pattern Match) | Private Function | MatchPatterns | This function goes through each element in the current pattern. It first evaluates to determine whether element is a placeholder or an indicator. If it is a placeholder, then it will try to bind the placeholder with some value. If it is an indicator, then we try to locate it. There is a trick however. Depending on whether we are at current element is the head of the pattern or not we want to take different actions. If we are at the head, we want to look for the indicator or the placeholder. If we can't find it, then we know that the current pattern doesn't exist and we quit. However, if it is not the head, then we continue looking, because there may still be a head somewhere. We retry in this case. |

-continued

| | | | |
|---|---|---|---|
| MatchMeetingField (BF.Pattern Match) | Private Function | MatchAPattern | This function uses a big switch statement to first determine what kind of placeholder we are talking about and depending on what type of placeholder, we have specific requirements and different binding criteria as specified in the subsequent functions called such as BindNames, BindTime etc. If binding is successful we add it to our guessing record. |
| BindNames (BF.Pattern Match) | Private Function | MatchMeetingField | In this function, we try to match names to the corresponding placeholder $PEOPLE$. Names are defined as any consecutive two words which are capitalized. We also what to retrieve a series of names which are connected by and, or & so we look until we don't see any of these 3 separators anymore. Note that we don't want to bind single word names because it is probably too general anyway so we don't want to produce broad but irrelevant results. This function calls BindAFullName which binds one name so in a since BindNames collects all the results from BindAFullName. |
| BindAFullName (BF.Pattern Match) | Private Function | BindNames | This function tries to bind a full name. If the $PEOPLE$ placeholder is not the head of the pattern, we know that it has to come right at the beginning of the test string because we've been deleting stuff off the head of the string all along. If it is the head, we search until we find something that looks like a full name. If we can't find it, then there's no such pattern in the text entirely and we quit entirely from this pattern. This should eventually return us to the next pattern in MatchPatterns. |
| GetNextWordAfterWhite Space (BF.Pattern Match) | Private Function | BindAFull Name, BindTime, BindCompanyTo picLoc | This function grabs the next word in a test string. It looks for the next word after white spaces, @ or A. The word is defined to end when we encounter another one of these white spaces or separators. |
| BindTime (BF.Pattern Match) | Private Function | MatchMeetingField | Get the immediate next word and see if it looks like a time pattern. If so we've found a time and so we want to add it to the record. We probably should add more time patterns. But people don't seem to like to enter the time in their titles these days especially since we now have tools like OutLook. |
| BindCompanyTopicLoc (BF.Pattern Match) | Private Function | MatchMeetingField | This function finds a continuous capitalized string and binds it to stMatch which is passed by reference |

-continued

| | | | |
|---|---|---|---|
| | | | from MatchMeetingField. A continuous capitalized string is a sequence of capitalized words which are not interrupted by things like, etc. There's probably more stuff we can add to the list of interruptions. |
| LocatePatternHead (BF.Pattern Match) | Private Function | MatchAPattern | This function tries to locate an element which is an indicator. Note that this indicator SHOULD BE AT THE HEAD of the pattern otherwise it would have gone to the function LocateIndicator instead. Therefore, we keep on grabbing the next word until either there's no word for us to grab (quit) or if we find one of the indicators we are looking for. |
| ContainInArray (BF.Pattern Match) | Private Function | LocatePattern Head, LocateIndicator | ' This function is really simple. It loops through all the elements in the array ' to find a matching string. |
| LocateIndicator (BF.Pattern Match) | Private Function | MatchAPattern | This function tries to locate an element which is an indicator. Note that this indicator is NOT at the head of the pattern otherwise it would have gone to LocatePatternHead instead. Because of this, if our pattern is to be satisfied, the next word we grab HAS to be the indicator or else we would have failed. Thus we only grab one word, test to see if it is a valid indicator and then return result. |
| InitializeGuessesRecord (BF.Pattern Match) | Private Sub | MatchAPattern | This function reinitializes our temporary test structure because we have already transferred the info to the permanent structure, we can reinitialize it so they each have one element. |
| AddToMeetingRecord (BF.Pattern Match) | Private Sub | MatchAPattern | This function is only called when we know that the information stored in tInCurrGuesses is valid meaning that it represents legitimate guesses of meeting fields ready to be stored in the permanent record, tInMeetingRecord. We check to make sure that we do not store duplicates and we also what to clean up what we want to store so that there's no cluttered crap such as punctuations, etc. The reason why we don't clean up until now is to save time. We don't waste resources calling ParseAndCleanPhrase until we know for sure that we are going to add it permanently. |
| NoDuplicate Entry (BF.Pattern Match) | Private Function | AddToMeetingRecord | This function loops through each element in the array to make sure that the test string aString is not the same as any of the strings already stored in the array. Slightly different from ContainInArray. |

| | | | |
|---|---|---|---|
| SearchAltaVista (BF.Search) | Public Function | GoBackGroundFinder | This function prepares a query to be submitted to AltaVista Search engine. It submits it and then parses the returning result in the appropriate format containing the title, URL and body/summary of each story retrieved. The number of stories retrieved is specified by the constant NUM_AV_STORIES. Important variables include stURLAltaVista used to store query to submit stResultHTML used to store html from page specified by stURLAltaVista. |
| ConstructAltaVistaURL (BF.Search) | Private Function | SearchAltaVista | This function constructs the URL string for the alta vista search engine using the advanced query search mode. It includes the keywords to be used, the language and how we want to rank the search. Depending on whether we want to use the results of our pattern matching unit, we construct our query differently. |
| ConstructSimpleKeyWord (BF.Search) | Private Function | ConstructAltaVistaURl, ConstructNewsPageURL | This function marches down the list of keywords stored in the stTitleKW or stBodyKW fields of the input meeting record and links them up into one string with each keyword separated by a connector as determined by the input variable stInConnector. Returns this newly constructed string. |
| ConstructComplexAVKeyWord (BF.Search) | Private Function | ConstructAltaVistaURL | This function constructs the keywords to be send to the AltaVista site. Unlike ConstructSimpleKeyWord which simply takes all the keywords from the title to form the query, this function will look at the results of BF's pattern matching process and see if we are able to identify and specific company names or topics for constructing the queries. Query will include company and topic identified and default to simple query if we cannot identify either company or topic. |
| JoinWithConnectors (BF.Search) | Private Function | ConstructComplexAVKey Word, ConstructComplexNPKey Word, RefineWith Rank | This function simply replaces the spaces between the words within the string with a connector which is specified by the input. |
| RefineWithDate (NOT CALLED AT THE MOMENT) (BF.Search) | Private Function | ConstructAltaVistaURL | This function constructs the date portion of the alta vista query and returns this portion of the URL as a string. It makes sure that alta vista searches for articles within the past PAST_NDAYS. |
| RefineWithRank (BF.Search) | Private Function | ConstructAltaVistaURL | This function constructs the string needed to passed to AltaVista in order to rank an advanced query search. If we are constructing the simple query we will take in |

| | | | |
|---|---|---|---|
| | | | all the keywords from the title. For the complex query, we will take in words from company and topic, much the same way we formed the query in ConstructComplexAVKeyWord. |
| IdentifyBlock (BF.Parse) | Public Function | SearchAltaVista, SearchNewsPage | This function extracts the block within a string marked by the beginning and the ending tag given as inputs starting at a certain location(iStart). The block retrieved does not include the tags themselves. If the block cannot be identified with the specified delimiters, we return unsuccessful through the parameter iReturnSuccess passed to use by reference. The return type is the block retrieved. |
| IsOpenURL Error (BF.Error) | Public Function | SearchAltaVista, SearchNewsPage | This function determines whether the error encountered is that of a timeout error. It restores the mouse to default arrow and then returns true if it is a time out or false otherwise. |
| SearchNews Page (BF.Search) | Public Function | GoBackGroundFinder | This function prepares a query to be submitted to NewsPage Search engine. It submits it and then parses the returning result in the appropriate format containing the title, URL and body/summary of each story retrieved. The number of stories retrieved is specified by the constant UM_NP_STORIES. |
| ConstructNewsPageURL (BF.Search) | Private Function | SearchNewsPage | This function constructs the URL to send to the NewsPage site. It uses the information contained in the input meeting record to determine what keywords to use. Also depending whether we want simple or complex query, we call different functions to form strings. |
| ConstructComplexNPKey Word (BF.Search) | Private Function | ConstructNewsPageURL | This function constructs the keywords to be send to the NewsPage site. UnlikeConstructKeyWordString which simply takes all the keywords from the title to form the query, this function will look at the results of BF's pattern matching process and see if we are able to identify any specific company names or topics for constructing the queries. |
| ConstructOverallResult (BF.Main) | Private Function | GoBackGroundFinder | This function takes in as input an array of strings (stInStories) and a MeetingRecord which stores the information for the current meeting. Each element in the array stores the stories retrieved from each information source. The function simply constructs the appropriate output to send to Munin including a return message type to let Munin know that |

-continued

| | | | |
|---|---|---|---|
| ConnectAnd TransferTo Munin (BF.Main) | Public Sub | GoBackGroundFinder | it is the BF responding and also the original user_id and meeting title so Munin knows which meeting BF is talking about. This function allows Background Finder to connect to Munin and eventually transport information to Munin. We will be using the UDP protocol instead of the TCP protocol so we have to set up the remote host and port correctly. We use a global string to store gResult Overall because although it is unnecessary with UDP, it is needed with TCP and if we ever switch back don't want to change code. |
| DisconnectFromMuninAnd Quit (BF.Main) | Public Sub | | |

FIG. 20 shows a flowchart of the actual code utilized to prepare and submit searches to the Alta Vista and NewsPage search engines in accordance with an embodiment of the present invention. Processing commences at function block 2001 where a command line is utilized to update a calendar entry with specific calendar information. The message is next posted in accordance with function block 2002 and a meeting record is created to store the current meeting information in accordance with function block 2003. Then, in function block 2004 the query is submitted to the Alta Vista search engine and in function block 2005, the query is submitted to the NewsPage search engine. When a message is returned from the search engine, it is stored in a results data structure as shown in function block 2006 and the information is processed and stored in summary form in a file for use in preparation for the meeting as detailed in function block 2007.

FIG. 21 provides more detail on creating the query in accordance with an embodiment of the present invention. Processing commences at function block 2105 where the meeting record is parsed to obtain potential companies, people, topics, location and a time. Then, in function block 2106, at least one topic is identified and in function block 2107, at least one company name is identified and finally in function block 2108, a decision is made on what material to transmit to the file for ultimate consumption by the user.

FIG. 22 is a variation on the query theme presented in FIG. 21. A meeting record is parsed in function block 2200, a company is identified in function block 2220, a topic is identified in function block 2230 and finally in function block 2240 the topic and or the company is utilized in formulating the query.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for conducting activities between users in a collaborative work tool architecture comprising the steps of:
    (a) affording a client user interface including at least one activity data field wherein the interface is operably coupled to a collaborative work environment having collaborative applications integrated with agents at the client, wherein the agents are intermediaries between the users and the applications;
    (b) automatically acquiring background information relevant to the at least one activity data field, wherein the at least one activity data field includes descriptive text and an activity start time, and wherein automatically acquiring background information includes automatically obtaining the descriptive text when the start time is within a predetermined period, parsing and pattern matching the descriptive text to identify searchable components of the descriptive text querying a plurality of sources across a network to obtain the background information, and storing the background information that is retrieved in response to querying the plurality of sources;
    (c) receiving a selection of a particular activity data field from a user;
    (d) presenting additional information on the selected activity field using the client user interface, wherein the additional information includes the background information;
    (e) allowing the user to input meeting data concerning the selected activity data field;
    (f) storing the meeting data on a server via the network; and
    (g) allowing a plurality of participant users access to the stored meeting data via the network.

2. A method as recited in claim 1, wherein the meeting data is voting data on a predefined topic.

3. A method as recited in claim 1, wherein the meeting data is user readable sentences concerning a predefined topic.

4. A method as recited in claim 1, wherein the meeting data is accessed by the participant users asynchronously.

5. A method as recited in claim 1, wherein the meeting data is accessed by the participant users synchronously.

6. A method as recited in claim 1, wherein the collaborative work tool architecture is distributed.

7. A computer program embodied on a computer readable medium for conducting activities between users in a collaborative work tool architecture comprising:
（a) a code segment for affording a client user interface including at least one activity data field wherein the interface is operably coupled to a collaborative work environment having collaborative applications integrated with agents at the client, wherein the agents are intermediaries between the users and the applications;
(b) a code segment for automatically acquiring background information relevant to the at least one activity data field, wherein the at least one activity data field includes descriptive text and an activity start time, and wherein automatically acquiring background information includes automatically obtaining the descriptive text when the start time is within a predetermined period, parsing and pattern matching the descriptive text to identify searchable components of the descriptive text, querying a plurality of sources across a network to obtain the background information, and storing the background information that is retrieved in response to querying the plurality of sources;
(c) a code segment for receiving a selection of a particular activity data field from a user;
(d) a code segment for presenting additional information on the selected activity field using the client user interface, wherein the additional information includes the background information;
(e) a code segment for allowing the user to input meeting data concerning the selected activity data field;
(f) a code segment for storing the meeting data on a server via the network; and
(g) a code segment for allowing a plurality of participant users access to the stored meeting data via the network.

8. A computer program as recited in claim 7, wherein the meeting data is voting data on a predefined topic.

9. A computer program as recited in claim 7, wherein the meeting data is user readable sentences concerning a predefined topic.

10. A computer program as recited in claim 7, wherein the meeting data is accessed by the participant users asynchronously.

11. A computer program as recited in claim 7, wherein the meeting data is accessed by the participant users synchronously.

12. A computer program as recited in claim 7, wherein the collaborative work tool architecture is distributed.

13. A system for conducting activities between users in a collaborative work tool architecture comprising:
(a) logic for affording a client user interface including at least one activity data field wherein the interface is operably coupled to a collaborative work environment having collaborative applications integrated with agents at the client, wherein the agents are intermediaries between the users and the applications;
(b) logic for automatically acquiring background information relevant to the at least one activity data field, wherein the at least one activity data field includes descriptive text and an activity start time, and wherein automatically acquiring background information includes automatically obtaining the descriptive text when the start time is within a predetermined period, parsing and pattern matching the descriptive text to identify searchable components of the descriptive text, querying a plurality of sources across a network to obtain the background information, and storing the background information that is retrieved in response to querying the plurality of sources;
(c) logic for receiving a selection of a particular activity data field from a user;
(d) logic for presenting additional information on the selected activity field using the client user interface, wherein the additional information includes the background information;
(e) logic for allowing the user to input meeting data concerning the selected activity data field;
(f) logic for storing the meeting data on a server via the network; and
(g) logic for allowing a plurality of participant users access to the stored meeting data via the network.

14. A system as recited in claim 13, wherein the meeting data is voting data on a predefined topic.

15. A system as recited in claim 13, wherein the meeting data is user readable sentences concerning a predefined topic.

16. A system as recited in claim 13, wherein the meeting data is accessed by the participant users asynchronously.

17. A system as recited in claim 13, wherein the meeting data is accessed by the participant users synchronously.

18. A system as recited in claim 13, wherein the collaborative work tool architecture is distributed.

* * * * *